United States Patent [19]

Itoh

[11] Patent Number: 4,798,929
[45] Date of Patent: Jan. 17, 1989

[54] WIRE ELECTRIC DISCHARGE MACHINING APPARATUS

[75] Inventor: Tetsuroh Itoh, Aichi, Japan

[73] Assignee: Mitsubishi Denki Kabushiki Kaisha, Tokyo, Japan

[21] Appl. No.: 57,201

[22] Filed: Jun. 3, 1987

[30] Foreign Application Priority Data

| Jun. 3, 1986 | [JP] | Japan | 61-128722 |
| Jun. 3, 1986 | [JP] | Japan | 61-128723 |
| Jun. 3, 1986 | [JP] | Japan | 61-128724 |
| Jun. 3, 1986 | [JP] | Japan | 61-128725 |
| Jun. 3, 1986 | [JP] | Japan | 61-128726 |
| Jun. 3, 1986 | [JP] | Japan | 61-128727 |
| Jun. 3, 1986 | [JP] | Japan | 61-128728 |
| Jun. 3, 1986 | [JP] | Japan | 61-128729 |
| Jun. 3, 1986 | [JP] | Japan | 61-128730 |
| Jun. 3, 1986 | [JP] | Japan | 61-128731 |
| Jun. 3, 1986 | [JP] | Japan | 61-128732 |
| Jun. 3, 1986 | [JP] | Japan | 61-128733 |
| Jun. 3, 1986 | [JP] | Japan | 61-128734 |
| Jun. 3, 1986 | [JP] | Japan | 61-128735 |
| Jun. 3, 1986 | [JP] | Japan | 61-128736 |

[51] Int. Cl.$^4$ ............ B23H 7/02; B23H 1/02; B23H 1/10; B23H 7/14
[52] U.S. Cl. ............ 219/69 W; 219/69 C; 219/69 D; 219/69 G; 219/69 S
[58] Field of Search ............ 219/69 G, 69 S, 69 P, 219/69 C, 69 M

[56] References Cited

U.S. PATENT DOCUMENTS

| 2,979,639 | 4/1961 | Williams et al. | 219/69 P |
| 3,459,916 | 8/1969 | Ferguson | 219/69 M |
| 3,609,281 | 9/1971 | Kauffman | 219/69 S |
| 4,322,595 | 3/1982 | Fowell et al. | 219/69 C |
| 4,447,696 | 5/1984 | Niwa | 219/69 P |
| 4,510,364 | 4/1985 | Ito | 219/69 S |
| 4,731,514 | 3/1988 | Naotake et al. | 219/69 W |

FOREIGN PATENT DOCUMENTS

| 3023302 | 1/1981 | Fed. Rep. of Germany | 219/69 G |
| 3327470 | 2/1984 | Fed. Rep. of Germany | 219/69 S |
| 2399892 | 4/1979 | France | 219/69 G |
| 152527 | 11/1981 | Japan | 219/69 G |
| 860976 | 9/1981 | U.S.S.R. | 219/69 S |
| 998077 | 2/1983 | U.S.S.R. | 219/69 G |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A wire electrical discharge machining apparatus capable of adequately ascertaining whether the condition of the machining gap is good or bad without lowering the machining speed while preventing damage to the wire electrode. The apparatus includes a high-frequency voltage source that supplies voltage to the gap between applications of DC voltage machining pulses. In response to the application of high-frequency voltage to the gap a current detector and two voltage comparators detect the degree of electric insulation (i.e. dielectric strength) of the machining liquid in the gap. The condition of the gap is determined based upon comparison between the detected degree of electric insulation and a predetermined reference value. In response to the determined condition of the machining liquid gap conditions such as the machining pulse shape, gap width, wire tension, wire feed rate, rate of renewal of the machining liquid, and resistivity of the machining liquid may be changed.

20 Claims, 22 Drawing Sheets

WIRE ELECTRIC DISCHARGE MACHINING APPARATUS

BACKGROUND OF THE INVENTION

The present invention relates to an electric discharge machining apparatus for machining a workpiece with the discharge energy of an electric discharge produced between an electrode and the workpiece.

Electric discharge machining are classified into apparatus in which a workpiece is machined by a rod-shaped electrode and apparatus in which a workpiece is machined by relatively moving the workpiece and a wire electrode passing through a hole which has been defined as by drilling in the workpiece.

One conventional electric discharge machining apparatus using a wire electrode will be described with reference to FIG. 1 of the accompanying drawings. As shown in FIG. 1, a workpiece 1 has a hole 1a defined therethrough, and a wire electrode 2 extends through the hole 1a, with an insulating liquid 3 supplied between the workpiece 1 and the wire electrode 2. The insulating liquid 3, hereinafter referred to as a machining liquid, is delivered from a tank 4 by a pump 5 and ejected by a nozzle 6 into a gap (interelectrode gap) between the workpiece 1 and the wire electrode 2.

The workpiece 1 and the wire electrode 2 are relatively moved by moving a table 11 on which the workpiece 1 is placed. The table 11 is moved by a Y-axis motor 13 and an X-axis motor 12. The relative movement of the workpiece 1 and the wire electrode 2 occurs in a two-dimensional plane lying on the X- and Y-axes.

The wire electrode 2 is supplied from a wire supply reel 7 and guided by lower and upper wire guides 8A, 8B to pass through the workpiece 1. The wire electrode 2 then travels through an electric energy feeder 9 and is wound on a wire take-up and tension roller 10.

The X- and Y-axis motors 12, 13 are driven and controlled by a control unit 14 which may comprise a numerical control unit (NC unit), a profiling unit, or a controller employing a computer.

The electric energy is generated by a machining power supply unit 15 comprising, for example, a DC power supply 15a, a switching device 15b, a current-limiting resistor 15c, and a control circuit 15d for controlling the switching device 15b.

Operation of the conventional EDM apparatus shown in FIG. 1 is as follows: A high-frequency pulse voltage is applied by the machining power supply unit 15 between the workpiece 1 and the wire electrode 2. Part of the workpiece 1 is melted and scattered by a discharge explosion produced by one pulse. During this time, the interelectrode gap is filled with a gas and is ionized. Therefore, a certain quiescent time is required before a next pulse voltage is applied. If the quiescent time were too short, an electric discharge would be produced again in the same position before the gap is sufficiently insulated, causing wire electrode 2 to be melted.

Therefore, where an ordinary machining power supply unit is employed, it is customary to machine the workpiece under such electric conditions as not to cause the wire to be cut off, for example, by controlling the quiescent time of the power supply unit 15 dependent on the type and thickness of the workpiece, etc. Thus, the machining speed is considerably lower than a theoretically possible limit speed. Furthermore, the wire electrode 2 will be melted away if it is not uniform but varies in thickness or it has a protuberance, a flaw, or other defect, causing discharge concentration.

To prevent the wire electrode 2 from being broken in the conventional wire cutting electric discharge machining apparatus, it has been the prior practice to reduce the output energy from the machining power supply unit 15, for example, to avoid wire breakage even when the discharge is concentrated on a certain point on the wire electrode 2. This however has resulted in a very low machining speed.

One conventional solution has been to ascertain whether the machining condition is good or bad or to check the electrode for its condition immediately prior to damage, and to take a safety measure by returning the machining process automatically back to a normal machining condition or avoiding damage to the electrode, based on the result of the checking process, so that the machining speed will be prevented from being lowered.

The most general way of ascertaining whether the machining condition is good or bad or checking the electrode for its condition immediately prior to damage is to observe the average value of the voltage applied between the electrode and the workpiece. When the average voltage is low, the interelectrode impedance is low, indicating that the insulation for electric discharges is liable to be lost and a discharge concentration (which is most responsible for wire breakage) is occurring due to short-circuiting or a deposit of sludge or machining chips.

When machining with a small interelectrode gap (which is indispensable for high-accuracy machining), however, frequent short circuits take place even when the interelectrode gap is in a normal condition. The machining efficiency is lowered if the short circuits are detected for taking a safety measure.

SUMMARY OF THE INVENTION

In view of the above-mentioned problems of the conventional electric discharge machining apparatus, it is an object of the present invention to provide an electric discharge machining apparatus capable of adequately ascertaining whether a machining condition is good or bad without lowering the machining speed, and of preventing the electrode from being damaged.

In an electric discharge machining apparatus of the present invention, a high-frequency AC voltage at a frequency of 100 KHz or higher is superposed in a quiescent time (deionizing time between on-times, involving no machining) of a pulse voltage applied between an electrode and a workpiece. The electric discharge machining apparatus includes detecting means for detecting, the degree of electric insulation, or dielectric strength, of a machining liquid or solution in an interelectrode gap, from a current produced by applying the high-frequency AC voltage, and determining means for determining the condition of the interelectrode gap based on the result of comparison between the degree of insulation detected by the detecting means and a predetermined reference value. The electric discharge machining apparatus also has a gap monitoring capability for indicating the gap condition based on an output from the determining means.

According to the present invention, the degree of insulation independent of an ion density can be detected by applying the high-frequency AC voltage in the quiescent time of the pulse voltage. More specifically, when the high-frequency voltage is applied across the gap between the electrode and the workpiece, where sludge and ions are present, only the degree of insulation due to the sludge can be independently detected since the mobility of the ions is insensitive to the high frequency. Generally, accidents during the machining process are caused by a concentrated discharge point, which gives rise to wire breakage. The concentrated discharge point arises from a reduction in the gap impedance which is occasioned by sludge that has not been well discharged. The conventional arrangement for detecting the degree of insulation has also detected a reduction in the degree of insulation due to metal ions inasmuch as a unipolar voltage is applied. Although the density of metal ions is not responsible for discharge concentration, it has also been detected as indicating a bad gap condition and hence the safety recovery means is often operated. This is disadvantageous in that the machining efficiency is reduced. In the detecting means according to the present invention, however, the real cause of discharge concentration is detected, and the output from the detecting means is compared with the predetermined reference value by comparing means. Based on the result of such comparison, the determining means determines the gap condition. When control means receives an abnormality signal from the determining means, the control means recovers a normal gap condition so that the machining speed will not be lowered.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
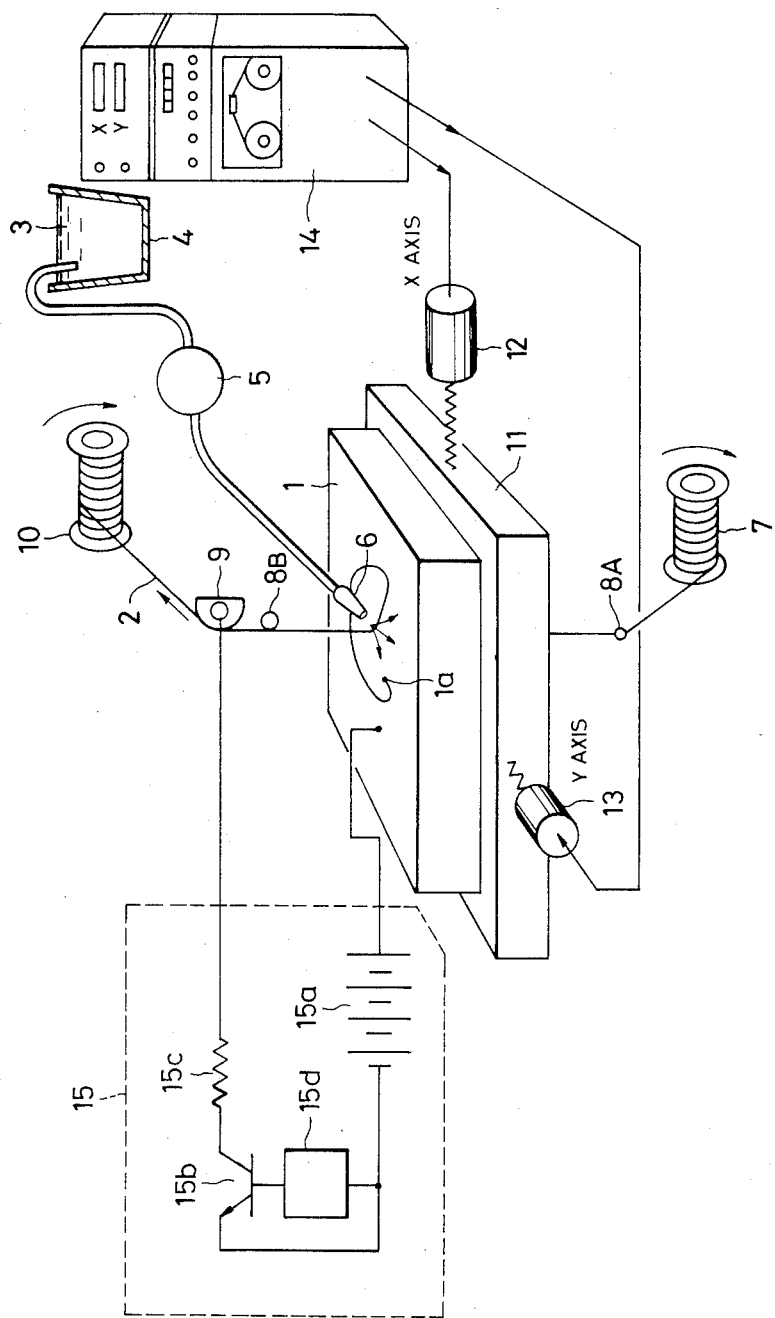
FIG. 1 is a schematic view of a conventional wire cutting electric discharge machining apparatus.
Figure 2:
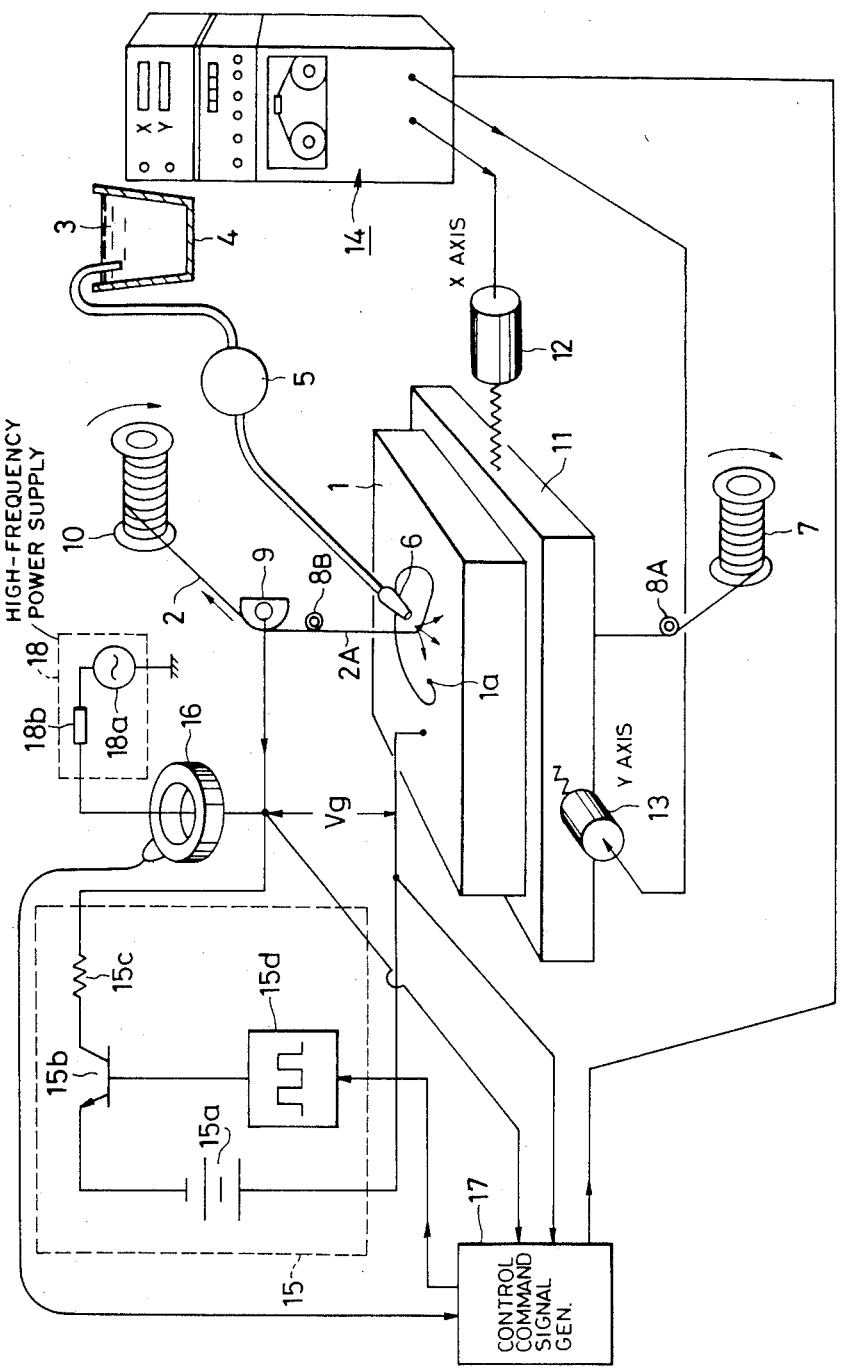
FIG. 2 is a schematic view of a wire cutting electric discharge machining apparatus according to the present invention.

FIG. 2 schematically illustrates an electric discharge machining apparatus according to the present invention. The electric discharge machining apparatus includes components denoted by the reference numerals 1 through 15, which are identical to the corresponding components of the conventional wire cutting electric discharge machining apparatus shown in FIG. 1.

The electric discharge machining apparatus includes a current detector 16 for detecting a leakage current flowing between the electrodes by means of a high-frequency power supply 18 due to a reduction in the interelectrode insulation caused by a sludge deposit, and a control command signal generator 17 having a receiving means for receiving a detected current from the current detector 16, an interelectrode voltage detecting means, a comparing means for comparing the detected voltage with a reference value, and a determining means for determining the gap condition based on an output from the comparing means, the control command signal generator 17 supplying control command signals to the control unit 14 and the machining power supply unit 15.

The high-frequency AC power supply 18 comprises an AC generator 18a for generating an AC voltage in the range of from 10 to 25V at a frequency of 1 MHz (which may be in the range from 100 KHz to 20 MHz), and a current limiting impedance element 18b connected in series with the AC generator 18a. When the machining power supply unit 15 generates a pulse voltage, the impedance element 18b prevents the AC voltage from affecting the interelectrode gap. Only when the switching device 15b of the power supply unit 15 is turned off, i.e., during a quiescent period, the AC voltage is applied by the AC generator 18 across the gap.

Figure 3:
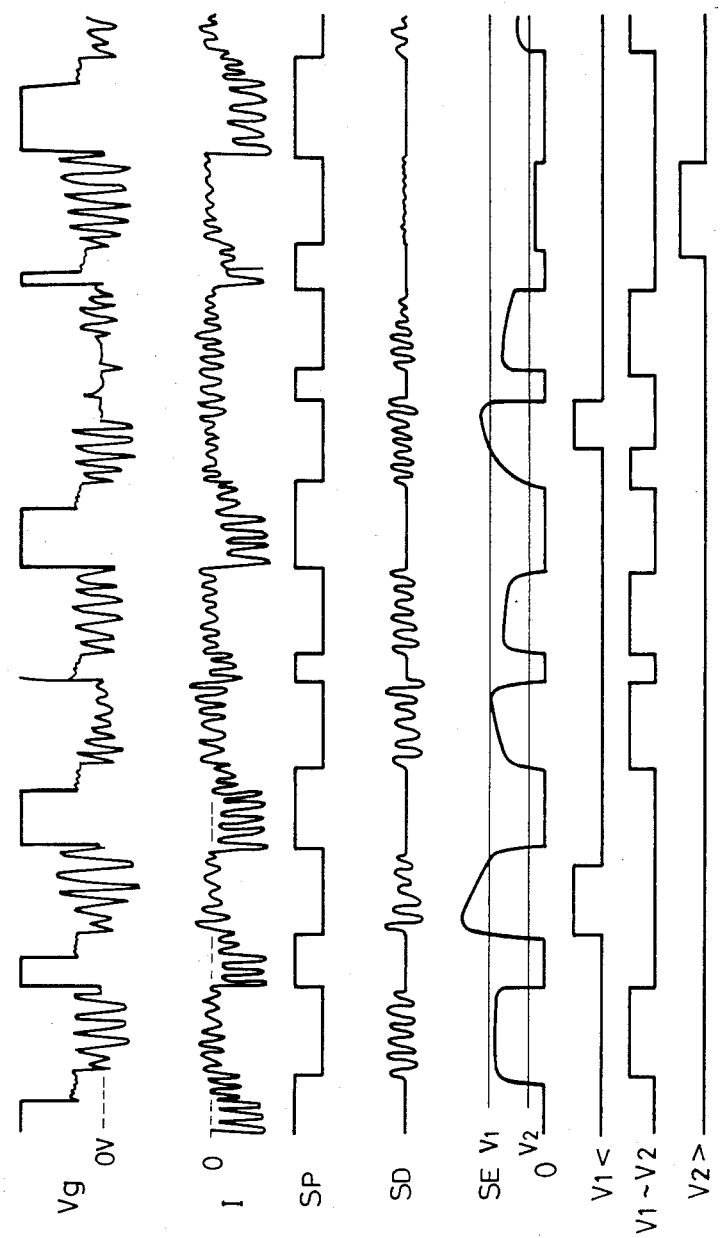
FIG. 3 is a timing chart of operation of the electric discharge machining apparatus of the invention.

FIG. 3 shows the waveforms of a voltage Vg applied across the gap (the high-frequency AC voltage applied during quiescent periods), a current signal I produced by the current detector 16, a signal SP produced when the pulse voltage of the machining power supply unit 15 is turned on, and a current signal SD picked up only during the quiescent periods. FIG. 3 also illustrates a signal SE generated by envelope-detecting the signal SD, the signal SE being divided into signal ranges by levels V1, V2. One of the signal ranges is higher than the level V1 (corresponding to 200 ohms or below), and a large leakage current flows in this range. An intermediate signal range lies above the level V2 (corresponding to 1.5 kilohms) and below the level V1. The other signal range is below the level V2 which is determined by the specific resistance of the liquid when the workpiece is not machined. These three signal ranges are thus expressed respectively by $V1<$, $V1-V2$, $V2>$.

Figure 4:
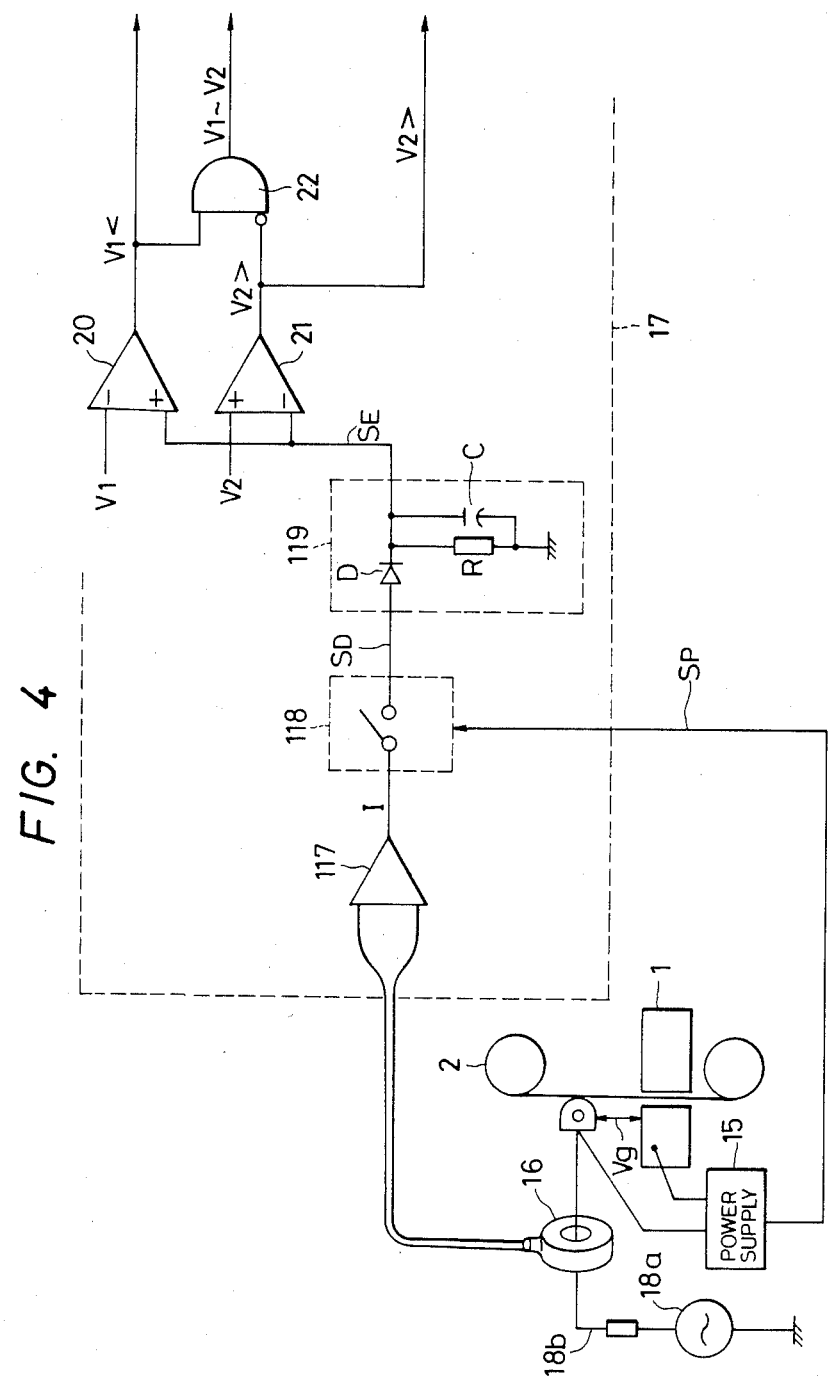
FIG. 4 is a circuit diagram of a detecting means for detecting the degree of insulation in an interelectrode gap.

FIG. 4 shows a circuit arrangement for producing the signals shown in FIG. 3. The current from the current detector 16 is amplified by an amplifier circuit 117 which applies a signal I to an analog switch 118. The analog switch 118 can be opened and closed under the control of the signal SP which is the quiescent-period component of the pulse signal from the machining power supply unit 15. In this embodiment, the signal I is passed through the analog switch 118 only during the quiescent periods. The signal SD is the signal which has passed through the analog switch 118. A circuit 119 for envelope-detecting the signal SD comprises a diode D, a resistor R, and a capacitor C. The output signal SE from the circuit 119 is applied to voltage comparators 20, 21. The voltage comparator 20 produces an output of 1 when the applied signal SE is larger than the level V1. The voltage comparator 21 generates an output of 1 when the applied signal SE is smaller than the level V2. An AND gate 22 has inputs connected to the outputs of the voltage comparators 20, 21 for producing a signal which is larger than the level V2 and smaller than the level V1.

According to an experiment, where the interelectrode impedance was 500 to 700 ohms or more, the electric discharge well caused the generation of an arc column in the liquid, the generation of intensive heat (at a temperature range from 5000° to 7000° C.), and the pinch effect, thus indicating the distribution of a sufficient amount of energy to the workpiece.

When the impedance was 200 ohms or lower, a spark discharge was present in the gap, but not directly between the electrode and the workpiece. Rather, the discharge took place between the electrode, the sludge deposit, and the workpiece, or between the electrode, the metal ions, and the workpiece. It was found that such discharge did not sufficiently distribute the energy to the workpiece but merely damaged the wire electrode. Therefore, the wire, electrode would be damaged or cut off unless such discharge condition were immediately removed.

Figure 5:
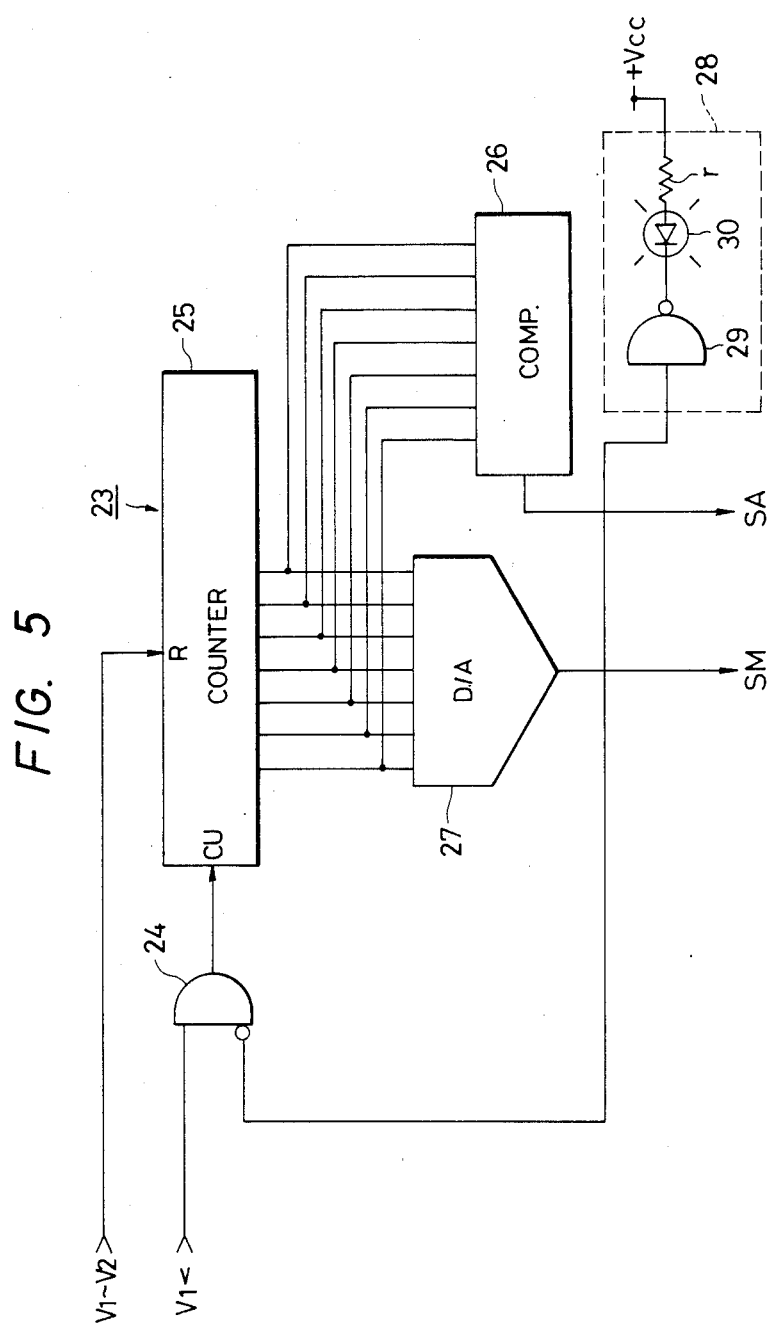
FIG. 5 is a circuit diagram of a determining means for determining the condition of the interelectrode gap.

The wire electrode can be prevented from being damaged or broken by controlling the machining condition dependent on whether the signal is lower than the level V1 or between the levels V1, V2. FIG. 5 shows a circuit arrangement of the determining means, denoted at 23, for determining the gap condition based on the output signals from the voltage comparators 20, 21. The signal indicating a reduced degree of insulation (V1<) is applied via a gate 24 to a counter 25 which counts the applied signal. The signal indicative of a normal degree of insulation (V1−V2) resets the counter 25. Therefore, the counter 25 does not keep on counting the signal unless an abnormal discharge condition continues.

The count of the counter 25 is thus representative of the condition of the interelectrode gap. If the discharge across the gap is normal, the count of the counter 25 is "0". If normal and abnormal discharges are alternately repeated, the average count of the counter 25 becomes larger as more abnormal discharges occur and becomes smaller as fewer a normal discharges are experienced.

In the event that an abnormal discharge goes on immediately before a breakage of the wire electrode 2, a digital comparator 26 coupled to the counter 25 produces a danger signal SA based on which control is made to improve the gap condition.

A D/A converter 27 is also coupled to the counter 25 to produce an analog output signal SM for analog display. The D/A converter 27 may for example be a multiplication-type digital-to-analog converter for issuing an output which is the product of the output of the counter 25 and a speed command signal Fx. One example of the D/A converter 27 is type AD7520 manufactured by Analog Device Inc., U.S.A. The D/A converter 27 thus serves as a variable resistor with respect to the input signal, the resistance of the variable resistor being variable according to the digital output from the counter 25.

The danger signal SA is supplied to a monitor circuit 28 comprising a NAND gate 29, a light-emitting diode (LED) 30, and a resistor r.

Figure 6:
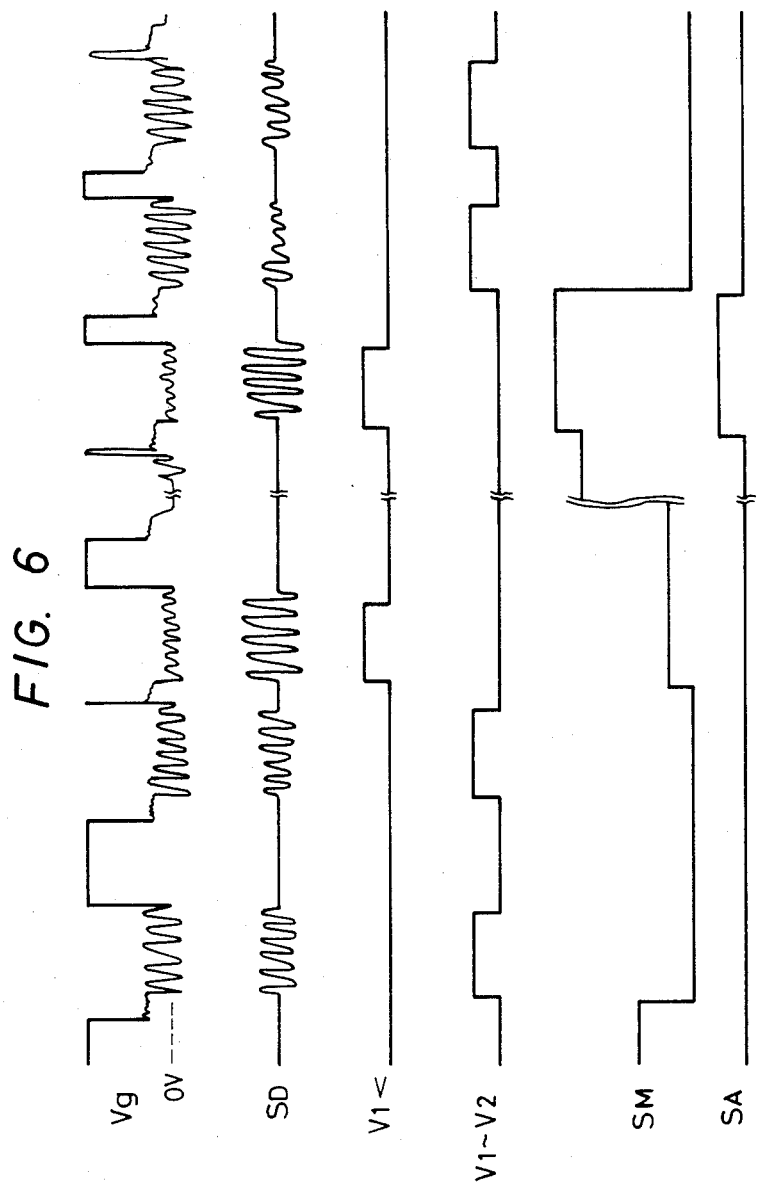
FIG. 6 is a timing chart of operation of the determining means.

FIG. 6 is a timing chart of operation of the determining means shown in FIG. 5 for detecting an abnormal electric discharge occurring across the gap. FIG. 6 shows the analog signal SM indicating the count of the counter 25, the danger signal SA, the current signals, and the gap voltage signal Vg.

Operation for monitoring and indicating the gap condition based on the count of the counter 25 will be described below.

A current SD is detected from an AC voltage applied during quiescent times of the waveform Vg of the voltage applied across the gap. When no insulation deterioration is experienced, the V1−V2 signal is generated in each quiescent time and the count of the counter 25 is reduced. The count of the counter 25 is issued as an analog value SM, which is observed on a voltmeter. When the observed voltage is low, the gap condition is judged as being normal.

As the insulation is deteriorated, the V1< signal is generated in a quiescent period, increasing the count of the counter 25. The corresponding analog voltage SM is increased and hence the gap condition is determined as being abnormal. When the voltage SM is in excess of a prescribed level, the danger signal SA is produced as described above. Therefore, the gap condition can be monitored by observing the voltage SM on the voltmeter.

A specific manner of operating a control means for recovering the gap condition to eliminate a trouble which would lead to a wire breakage, based on the count of the counter 25 will be described below. The off-time of the switching device 15b (FIG. 2) can be increased to increase the period between electric discharges based on the output from the detecting circuit, for thereby achieving a deionizing effect to remove a cause of discharge concentration. A control circuit and its operation for increasing the off-time of the switching device 15b will be described with reference to FIG. 7. When the output Q of an RS flip-flop 118 is "1", it is applied through an amplifier 119 to turn on the switching device 15b to start an on-time thereof. When the output Q of the RS flip-flop 118 becomes "0", an off-time of the switching device 15b begins. With Q=1, an AND gate 120 issues an output "0" until an on-time setting output τp of an on- and off-time setting counter 121 becomes "1". When the output τp becomes "1", the flip-flop 118 is reset, so that the output Q becomes "0" starting an off-time of the switching device 15b. At the same time, the output from the AND gate 120 is applied through an OR gate 122 to reset an oscillator OSC and the counter 121, which then starts a counting cycle again. When the output Q of the flip-flop 118 becomes "0", its output Q applied to an AND gate 123 becomes "1". However, the AND gate 123 does not produce an output "1" until its input connected to the output of an OR gate 124 becomes "1". The OR gate 124 and AND gates 125, 126 jointly serve to selectively establish two off-times, i.e., select τ1 when the signal SA is "0" and τ2 when the signal SA is "1". Therefore, the workpiece is machined with the off-time τ1 during a normal discharge and with the off-time τ2 during an abnormal discharge. Upon occurrence of an abnormal discharge, the quiescent period is suddenly increased to deionize the gap to thereby prevent any discharge concentration and hence wire breakages.

While there are two off-times τ1, τ2 that can be selected, the off-time can continuously be varied according to the count of the counter 25 which detects the number of discharge concentrations.

Figure 7:
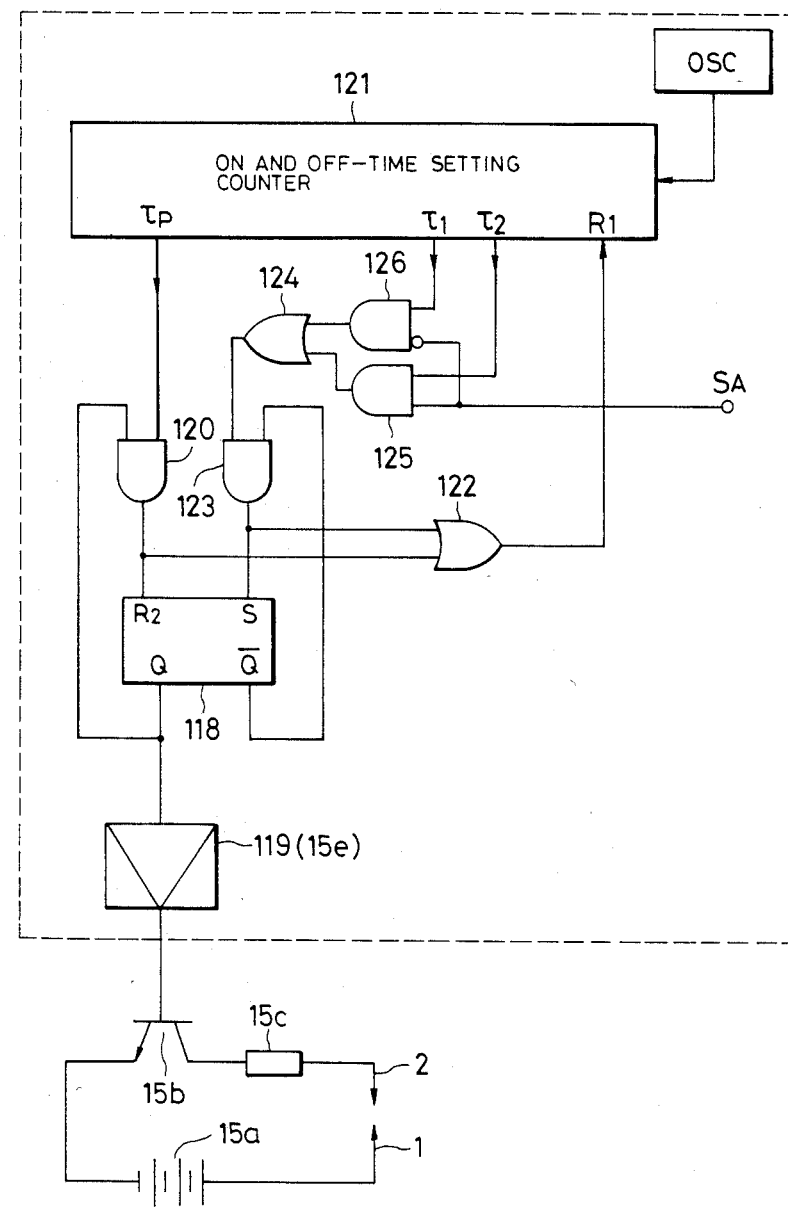
FIG. 7 is a circuit diagram of a control means according to a first embodiment of the present invention.
Figure 8:
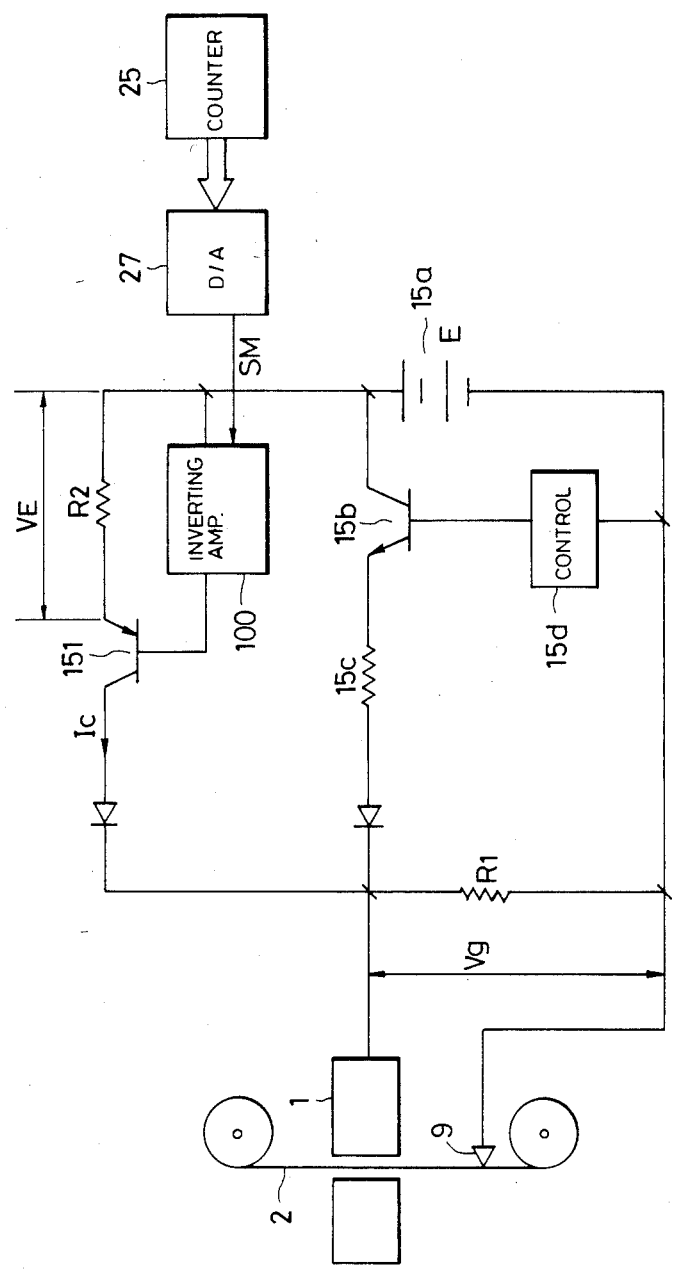
FIG. 8 is a circuit diagram of a control means according to a second embodiment of the present invention.

In the embodiment of FIG. 7, the quiescent time of the pulse voltage is increased to provide a deionizing effect for eliminating a cause of discharge concentration. FIG. 8 shows a control circuit of a second embodiment in which the voltage applied across the gap is varied dependent on the output signal to lower the discharge starting voltage for making it more difficult for discharges to occur, preventing discharges from concentrating in the gap, and when there is no discharge concentration, the voltage applied across the gap is increased to making it easier for discharges to take place in the gap:

An inverting amplifier 100 shown in FIG. 8 inverts the analog voltage SM from the D/A converter 27 dependent on the output from the counter 25, and applies the inverted voltage to the base of a PNP transistor 151. A voltage Vg applied across the gap is expressed as follows:

$$Vg = -I_c R_1 \quad (1)$$

A current Ic is substantially equal to (about 99% of) the current flowing through an emitter follower load R2 for a transistor 151. The current Ic is expressed by:

$$I_c = \frac{VE}{R2} \approx \frac{VB}{R2} \quad (2)$$

Thus, from the equations (1) and (2), the voltage Vg is given as follows:

$$Vg = -\frac{R1}{R2} VB \quad (3)$$

If $R_1 = 30$ K$\Omega$, $R_2 = 1$K$\Omega$, and E=300V, then the voltage Vg varies from 0 to 300V when VB varies from 0 to 10V.

When discharges are concentrated, the count of the counter 25 is increased, thereby reducing the output from the inverting amplifier 100. Then, the gap voltage Vg is lowered thereby to eliminate the discharge concentration.

The voltage applied across the gap is continuously varied dependent on the count of the counter 25 which detects discharge concentration in the preceding embodiment. The count of the counter and the gap voltage may not necessarily be in proportion to each other, but may be in series relation to each other for effective prevention of wire breakage. With the above embodiment, discharge concentration and bad gap conditions are distinguished from each other, and the voltage applied across the gap is controlled in order to cause discharges to be scattered, for thereby eliminating undesirable conditions which would lead to wire breakage.

Figure 9:
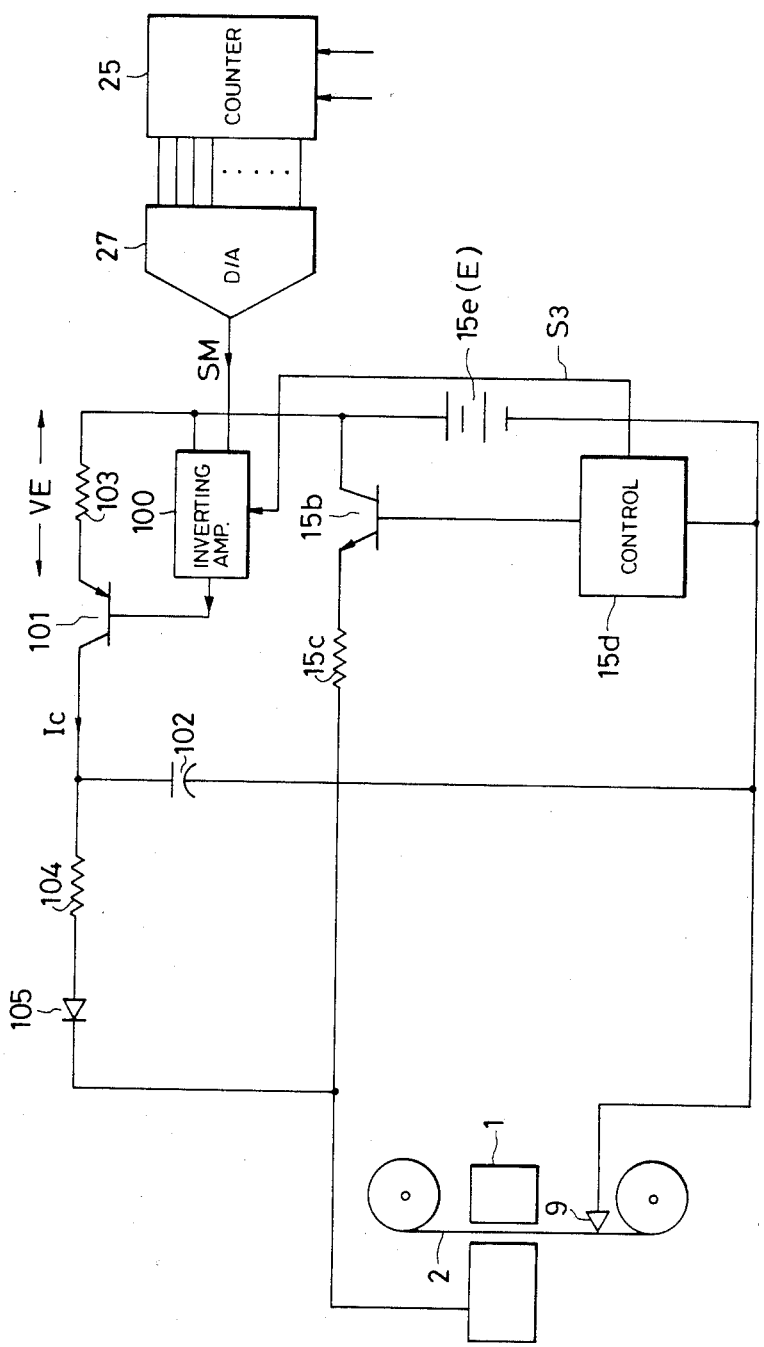
FIG. 9 is a circuit diagram of a control means according to a third embodiment of the present invention.
Figure 10:
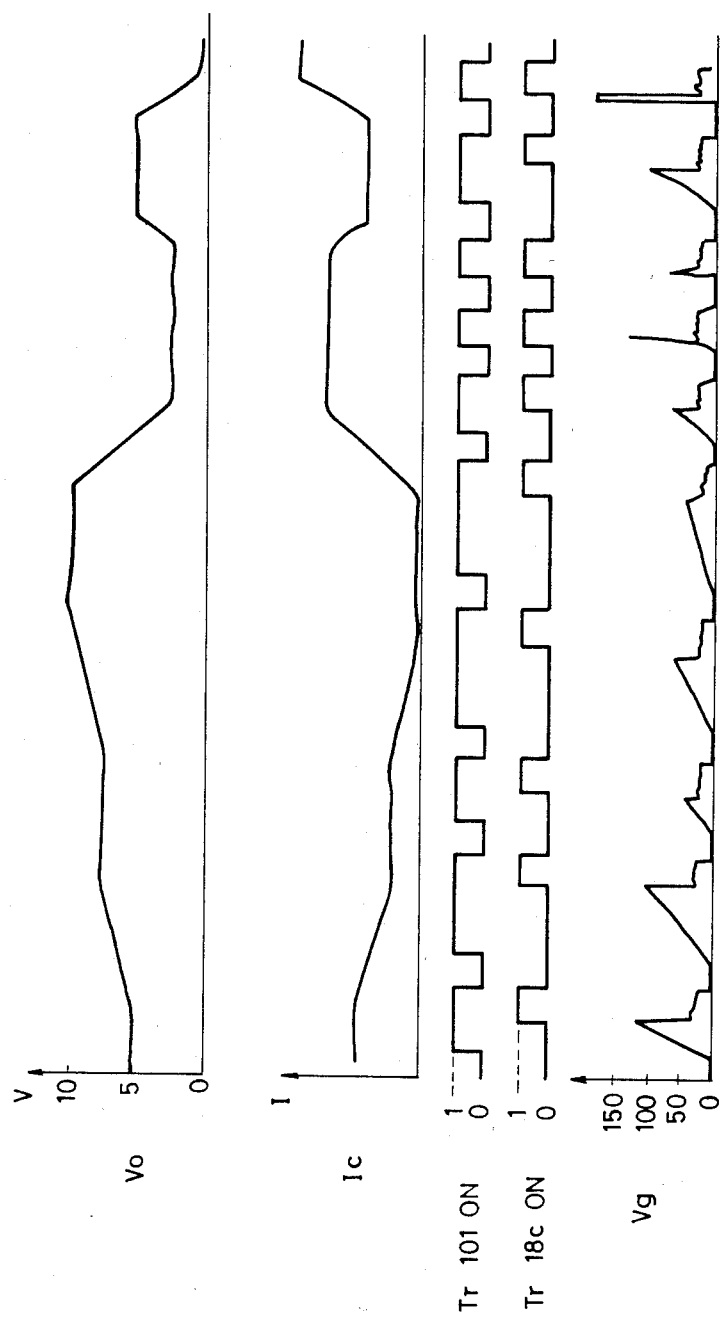
FIG. 10 is a timing chart explaining operation of the control means shown in FIG. 9.

FIGS. 9 and 10 illustrate a third embodiment in which a gap condition recovery means is operated on the basis of the count of the counter 25 to eliminate undesirable wire-breaking conditions.

The gradient of the voltage applied across the gap per time (dV/dt) may be varied on the basis of the output from the detecting circuit. When the gap condition is poor, the voltage applied across the gap is increased slowly to make it more difficult for discharges to occur across the gap. When the gap condition is good, the gap voltage is raised quickly to make it easier for discharges to take place, increasing the machining efficiency. FIG. 9 shows a control circuit arrangement for achieving such operation, and FIG. 10 illustrates a timing chart of such operation. An inverting amplifier 100 shown in FIG. 9 inverts the analog voltage SM from the D/A converter 27 dependent on the output from the counter 25, and applies the inverted voltage to the base of a PNP transistor 101.

A voltage Vg applied across the gap is expressed as follows:

$$Vg = I_c \times t / C \quad (1')$$

Where Ic is the collector current of the transistor 101, t is the time that has elapsed after the pulse voltage was applied, and C is the capacitance of a capacitor 102. The current Ic is substantially equal to (about 99% of) the current flowing through an emitter follower resistor 103 for the transistor 101. The current Ic is expressed by:

$$I_c = \frac{VE}{RE} \approx \frac{VB}{RE} \quad (2')$$

where RE is the value of the resistor 103, VE is the emitter voltage of the transistor 101, and VB is the base voltage thereof. Thus, from the equations (1') and (2'), the voltage Vg applied across the gap is given as follows:

$$Vg = \frac{VB \times t}{RE \times C} \quad (3')$$

If RE=5$\Omega$, C=0.01 $\mu$F, and VB ranges from 0 to 10V, then the voltage gradient dV/Dt varies from 0 to 200V/$\mu$S. The inverting amplifier 100 is designed such that when the input voltage is 0V, its output voltage is 10V, and when the input voltage is 10V, its output voltage is 0V. Therefore, as V0 is larger, i.e., as the gap condition gets worse, the gradient of the applied voltage dV/dt is reduced. A resistor 104 serves to discharge the capacitor 102 without affecting the machining operation, and a diode 105 serves to prevent a machining current from the switching transistor 15b from flowing back to the capacitor 102. The transistor 15b keeps turned on for a prescribed period of time after a discharge has occurred across the gap. The internal gate of the inverting amplifier 100 is also controlled by a control signal S3 from a pulse duration quiescent interval control circuit 15d to prevent a voltage from being imposed across the gap during a quiescent time. The timing chart of FIG. 10 specifically explains the above operation and shows the relationship between the detected voltage SM and the capacitor charging current Ic and the on/off states of the transistors by way of logic levels of 0 and 1.

When discharges are concentrated or a wire breakage is about to occur, the count of the counter 25 of the detecting circuit is increased thereby to reduce the output from the inverting amplifier for reducing the gradient of the voltage applied across the gap. Electric discharges are now less liable to take place across the gap, so that discharge concentration is eliminated and the gap condition is restored.

In the above embodiment, the gradient of the applied voltage is continuously controlled dependent on the count of the counter 25. However, the voltage gradient may not necessarily be varied continuously, but may be varied along a curve of polygonal lines or steps, or in series relation to the count of the counter.

According to the third embodiment, therefore, the gap is checked for any abnormal condition by the known detecting method, and the gradient of the applied voltage is varied according to the result of the check for recovering the gap condition for thereby controlling the ease with which discharges occur. Therefore, discharges are prevented from being concentrated at one point or a high voltage is prevented from being continuously applied while the gap is not being deionized, and the gap condition can be recovered.

Figure 11:
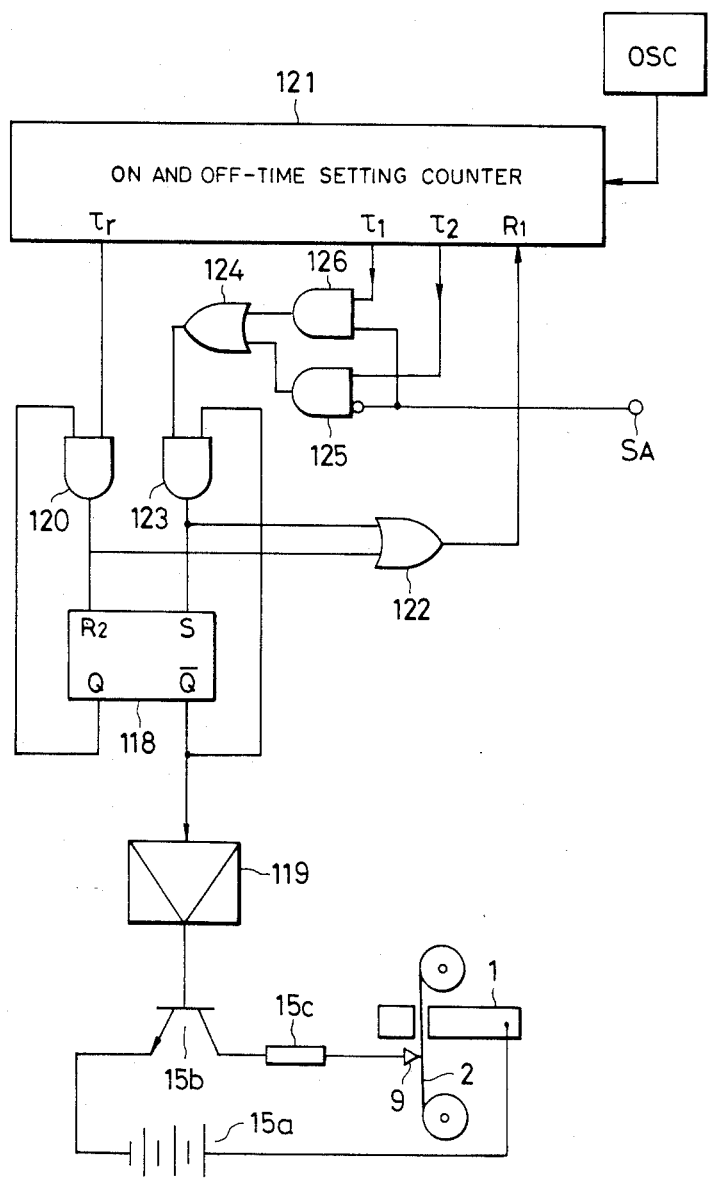
FIG. 11 is a circuit diagram of a control means according to a fourth embodiment of the present invention.

Based on the output obtained from the detecting circuit, the pulse duration of the pulse current may be varied and as a result the pulse duration and the pulse current peak value may simultaneously be controlled for combined control of the discharge energy to prevent the wire electrode from being broken. A circuit for achieving this and its operation will be described as a fourth embodiment with reference to FIG. 11.

When the output Q of an RS flip-flop 118 is "0" or its output $\bar{Q}$ is "1", the switching device 15b is turned on to start an on-time thereof. When Q=1, an off-time is started. When the output Q of the RS flip-flop 118 is "1", an AND gate 120 issues an output "0" until an on-time setting output $\tau r$ of an on- and off-time setting counter 121 becomes "1". When the output $\tau r$ becomes "1", the flip-flop 118 is reset, so that the output Q becomes "0" starting an off-time of the switching device 15b. At the same time, the output from the AND gate 120 is applied through an OR gate 122 to reset an oscillator OSC and the counter 121, which then starts a counting cycle again. When the output Q of the flip-flop 118 becomes "0", its output $\bar{Q}$ applied to an AND gate 123 becomes "1". However, the AND gate 123 does not produce an output "1" until its input connected to the output of an OR gate 124 becomes "1" The OR gate 124 and AND gates 125, 126 jointly serve to selectively establish two off-times, i.e., select $\tau 2$ when the signal SA is "0" and $\tau 1$ when the signal SA is "1". Therefore, the workpiece is machined with the off-time $\tau 2$ during a normal discharge and with the off-time $\tau 1$ during an abnormal discharge. Upon occurrence of an abnormal discharge, the pulse duration is suddenly reduced and the current peak value is reduced to reduce the discharge energy, so that the wire electrode is prevented from being consumed by discharges and hence from breakages.

The current peak value is lowered for the following reasons: The discharge peak current Ip is expressed by:

$$Ip = \frac{E - Vg}{R}\left(1 - \exp - \frac{R}{L}t\right)$$

where E is the power supply voltage, R is the value of the current limiting resistor, and L is the inductance of the feeder line. The gap arc voltage Vg is normally in the range of from 20 to 35V. The discharge peak current Ip becomes higher as the pulse duration t is increased. The inductance usually ranges from 0.5 to 1 μH. While in the above embodiment there are two pulse durations $\tau 1$ and $\tau 2$, the off-time may continuously be varied according to the count of the counter 25 which detects the number of discharge concentrations.

Figure 12:
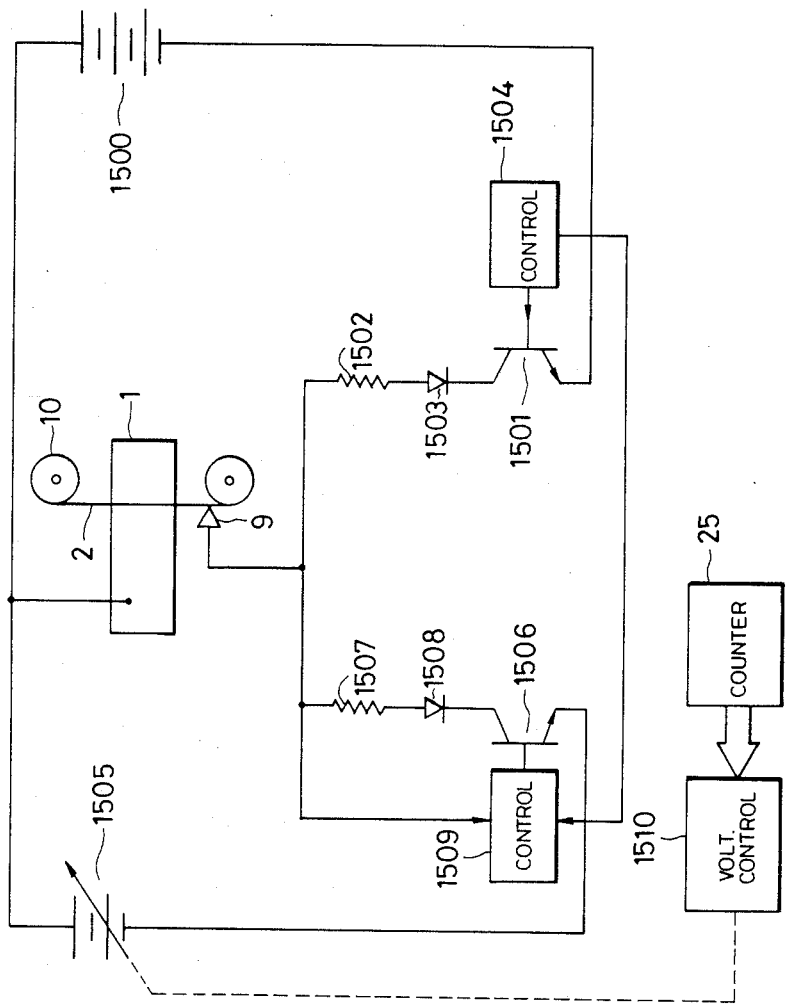
FIG. 12 is a circuit diagram of a control means according to a fifth embodiment of the present invention.
Figure 13:
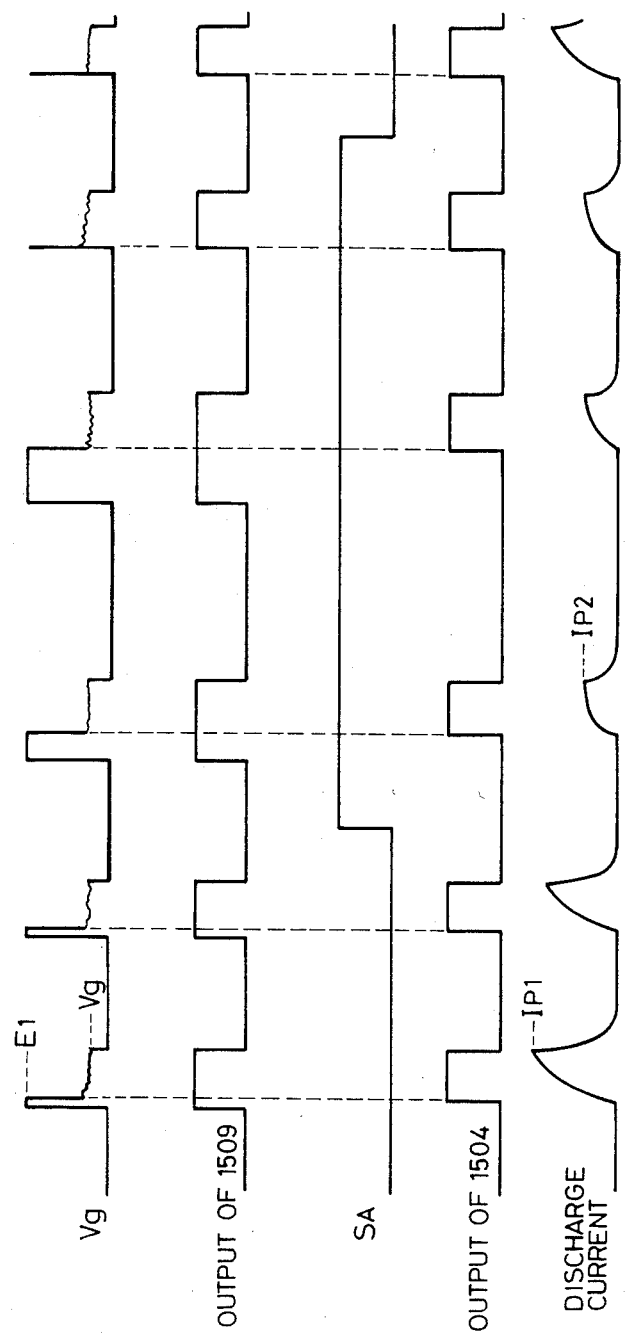
FIG. 13 is a timing chart explaining operation of the control means shown in FIG. 12.

FIGS. 12 and 13 show a fifth embodiment in which the peak value of a pulse current is controlled by varying the voltage of a main current circuit based on the output from the detecting circuit.

In FIG. 12, a machining current pulse feeder 9 is connected to two pulse current supply circuits. One of the pulse current supply circuits is composed of a fixed voltage supply 1500, a switching device 1501, a current limiting impedance element 1502, and a reverse-current preventing diode 1503. The pulse feeder 9 is controlled by the output from a switching control circuit 1504 so that the gap voltage is applied until a certain quiescent time and a discharge are reached, and after a discharge has taken place for a certain period of time, the quiescent time is waited for again. The duration and quiescent period of the pulse current are controlled by the switching control circuit 1504. The other current supply circuit comprises a variable voltage supply 1505, a switching device 1506, a current limiting impedance element 1507, and a reverse-current preventing diode 1508. When a current starts flowing across the gap, the current is supplied, and when the switching control circuit 1504 enters a quiescent period, the current is turned off. The voltage supplied from the variable voltage supply 1505 is varied by a voltage control circuit 1510 which operates according to the output from the abnormal-condition detecting counter 25. The discharge peak current value Ip is controlled as follows: The discharge peak current value Ip is expressed by:

$$Ip = \frac{E1 - Vg}{Z1} + \frac{E2 - Vg}{Z2}$$

where E1 is the voltage of the fixed voltage supply 1500, Z1, Z2 are the impedances of the current limiting impedance elements 1502, 1507, and E2 is the voltage of the variable voltage supply 1505. The gap arc voltage Vg ranges from 20 to 35V. When a signal is produced by the detecting circuit or counter 25 upon a bad gap condition, the voltage control circuit 1510 operates in response to the, signal, thus lowering the voltage E2 of the variable voltage supply 1505 and hence the current peak value. As shown in the timing chart of FIG. 13, the voltage E1 from the fixed voltage supply 1500 is applied across the gap, and only the discharge pulse current peak value Ip is controlled by the variable voltage supply E2. When the abnormal-condition detecting signal SA is "0", i.e., when the machining condition is good, the current peak Ip takes a high peak value Ip1. When an abnormal condition occurs and the signal SA becomes "1", the current peak Ip takes a low peak value Ip2. In wire-cutting machining operation, when Ip is high, the machining speed is high, but the amount of consumption of the wire electrode is also large, so that the wire is more liable to be broken. When Ip is low, the amount of consumption of the wire electrode is reduced in proportion to the current peak value, thereby preventing the wire from being broken. Only the current peak value is varied for the reason that it is experimentally confirmed that the workpiece surface being machined is less affected when only the current peak value is varied, and varying the current peak value largely affects the machining speed and the wire consumption.

While the current peak value Ip is controlled by varying the voltage in the above embodiment, it may also be controlled by varying the current limiting impedance element 1507.

Figure 14:
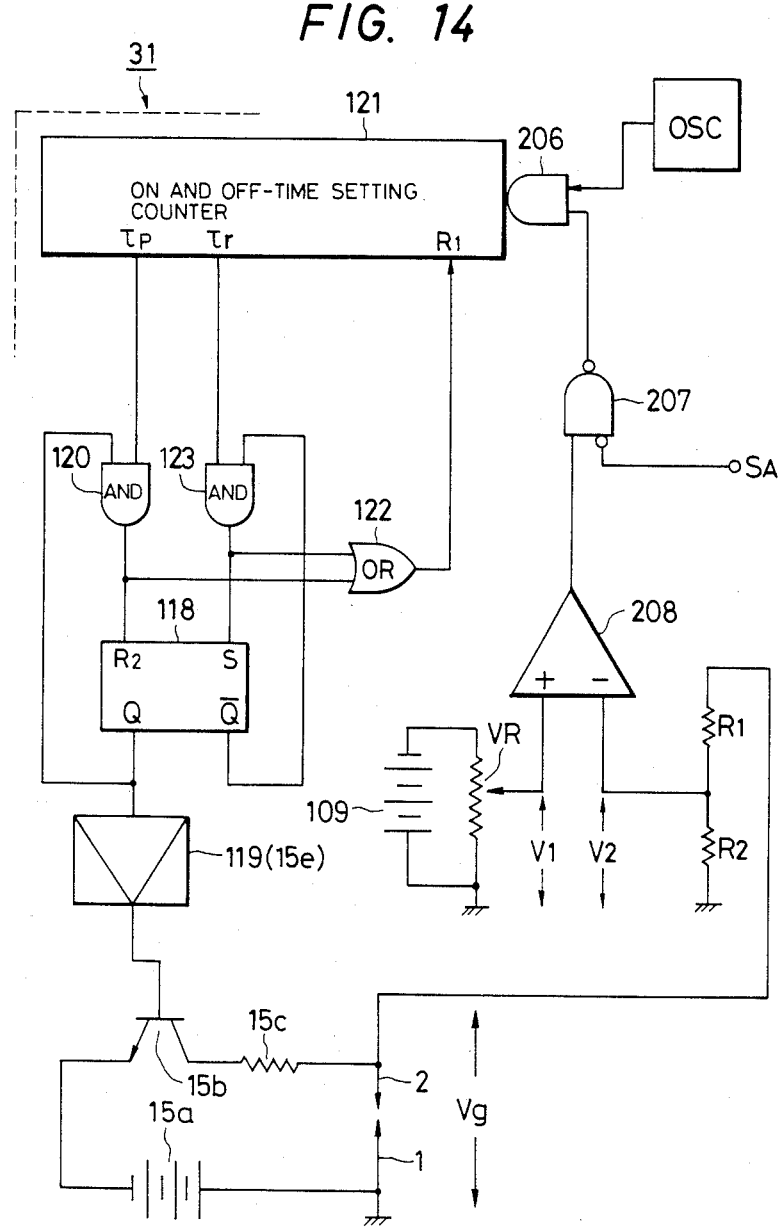
FIGS. 14 through 22 are circuit diagrams of control means according to sixth through fourteenth embodiments, respectively, of the present invention.

FIG. 14 shows a control means according to a sixth embodiment for controlling whether a pulse voltage is to be applied continuously or intermittently across the gap.

When the machining condition across the gap is normal, the switching device 15b is prevented from being turned off to avoid an undesired quiescent time until a discharge is caused by applying a pulse voltage across the gap. When the machining condition gets worse, a quiescent time is established even if no discharge occurs, thus completely deionizing the gap to eliminate the cause of discharge concentration.

When the output Q of an RS flip-flop 118 is "1", it is applied through an amplifier 119 to turn on the switching device 15b. With Q=1, an AND gate 120 issues an output "0" until an-on-time setting output τp of a counter 121 becomes "1". When the output τp becomes "1", the flip-flop 118 is reset, so that the output Q becomes "0" starting an off-time of the switching device 15b.

At the same time, the output from the AND gate 120 is applied through an OR gate 122 to reset an oscillator OSC and the counter 121, which then starts a counting cycle again.

When the output Q of the flip-flop 118 becomes "0", its output Q̄ becomes "1". The off-condition of the flip-flop 118 continues until one of the inputs of an AND gate 123, or an off-time setting terminal τr, becomes "1". Thus, the time period until the off-time setting terminal τr becomes "1" is an off-time.

In the circuit arrangement shown in FIG. 14, an input gate 206 connected to the counter 121 allows the output from the oscillator OSC to pass therethrough for determining whether the above on-off control is to be effected or not. The input to the input gate 206 is controlled by a NAND gate 207. Specifically, when the signal SA from the counter 25 is "1", i.e., when the machining condition is bad or the gap voltage Vg is low due to a short circuit, a discharge, or a quiescent time, the output from the oscillator OSC is counted by the counter 121.

The gap voltage Vg is applied through a voltage divider circuit R1, R2. A voltage comparator 208 compares a terminal voltage V2 from the voltage divider circuit with a reference voltage V1 produced by a power supply 209 and a variable resistor VR. When the terminal voltage V2 is higher than the reference voltage V1, the voltage comparator 208 issues an output of "1". If the signal SA is "0", the output from the NAND gate 207 is "0", so that the counter 121 does not count the output from the oscillator OSC.

Therefore, at the time the gap voltage Vg is high, no count is effected by the counter 121. Upon a short circuit, a discharge, a quiescent condition, or any other bad machining condition, the counter 121 counts the oscillator output to repeat the on-off operation of the switching device 15b.

Figure 15:
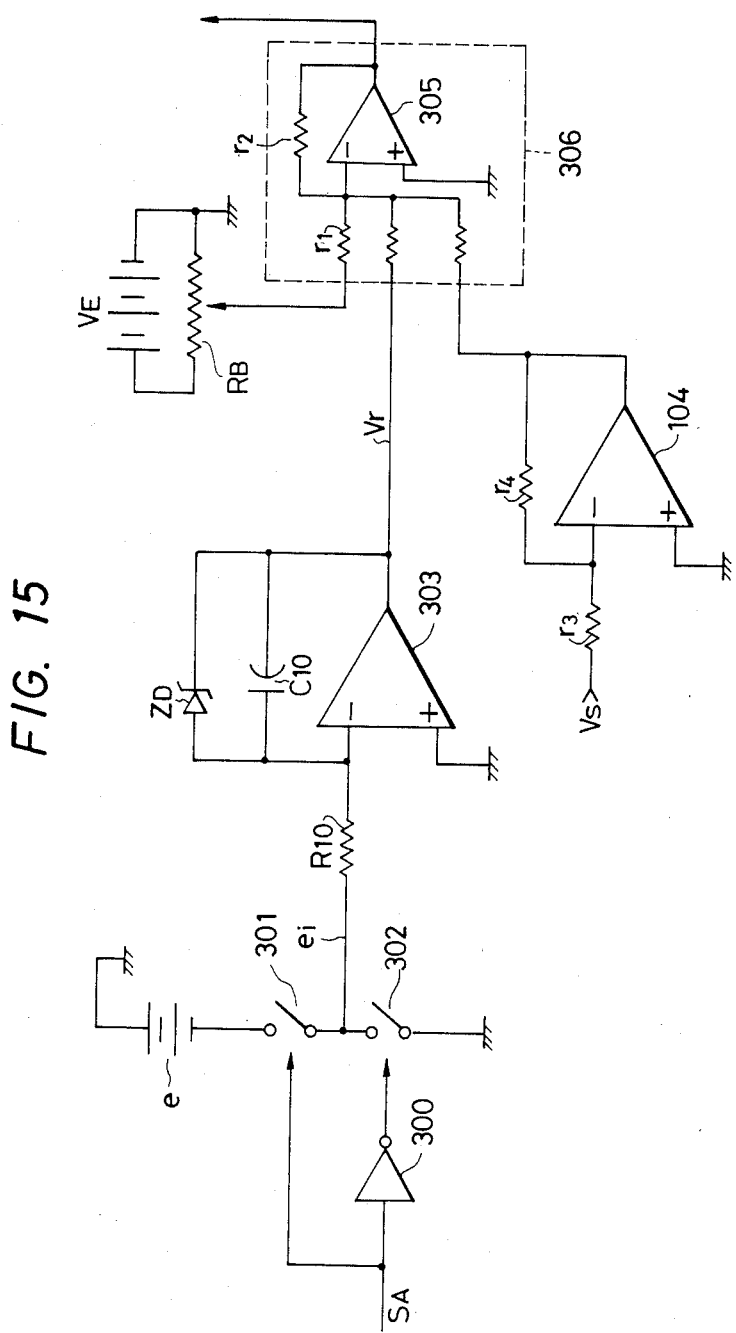

FIG. 15 shows a seventh embodiment in which the gap is controlled according to the signal SA to remove conditions leading to wire breakages. In this embodiment, a reference value Vr for a gap servo voltage is varied such that when an abnormal condition is caused, the reference voltage is increased to increase the average gap voltage, thereby increasing the gap length to make it difficult for discharges to take place and hence to prevent discharge concentration. A control means for controlling the servo reference voltage is shown in FIG. 15.

When the signal SA is "1", i.e., when an abnormal condition is present in the gap, an inverter 300 produces an output "0", turning on an analog switch 301 and turning off an analog switch 302. An input voltage ei= −e is applied to an integrator circuit composed of an operational amplifier 303, a resistor R10, a capacitor C10, and a zener diode ZD. A servo reference voltage Vr is expressed by:

$$Vr = V + \frac{e}{R10\,C10} t \qquad (1)$$

where V indicates an initial value at t=0. Consequently, insofar as the signal SA is "1", the reference voltage Vr continues to increase, and, in response to such an increase, the average voltage Vs applied across the gap is negatively increased. The output of an output circuit 306 comprising an operational amplifier 305 and resistors r1, r2 is thus varied to increase the interelectrode gap.

When the signal SA is "0", i.e., when no discharge concentration or abnormal condition presents in the gap, the input voltage ei becomes "0", and the integrating capacitor C10 is discharged. Therefore, the reference voltage Vr is lowered to reduce the gap, with the result that electric discharges are produced more frequently across the gap and the machining speed rises. The values of the resistor R10 and the capacitor C10 are selected such that the integrating time constant determined thereby is of the order of several tens of seconds. If the reference voltage were varied in too short a time, the gap would be varied abruptly enough to cause hunting or electrode vibration.

The reference voltage Vr is limited by the zener diode ZD to range between a zener voltage (positive direction) and "0" (negative direction). A power supply VE and a variable resistor RB serve to achieve a manual setting across which the gap will automatically be controlled. An operational amplifier 304 and resistors r3, r4 serve as an inverting circuit and an attenuator for adding the average voltage Vs across the gap and the reference voltage Vr.

Although in the above embodiment the signal SA is integrated to vary the reference voltage Vr, the count of the counter 25 may be converted from a digital value to an analog value which may then be passed through a first-order delay circuit having a large time constant for finer control.

Figure 16:
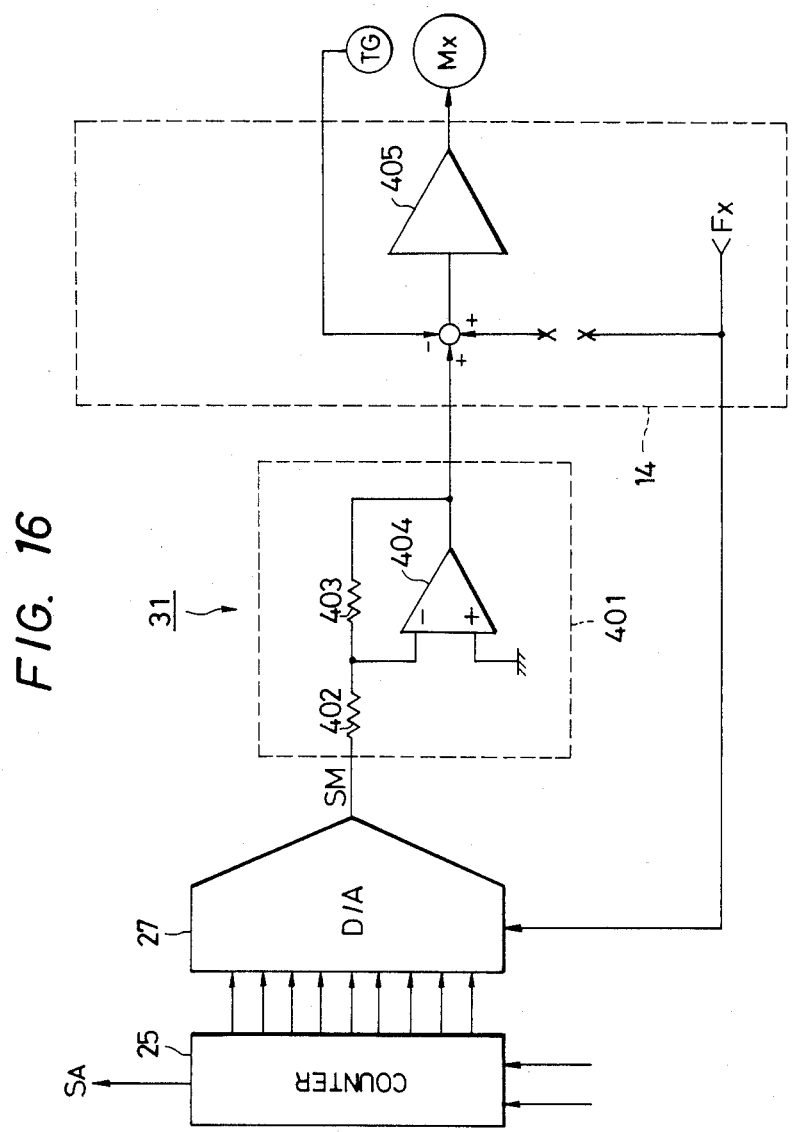

Instead of controlling the servo reference voltage as shown in FIG. 15, an eighth embodiment illustrated in FIG. 16 varies the servo gain, i.e., the sensitivity, of a means for controlling the gap for recovery from a short circuit, an open condition, or a condition immediately before the wire electrode would be broken. More specifically, when the gap condition is poor, the servo gain is increased to increase the speed at which the gap is reduced and increased for quickly avoiding a mechanically bad condition to recover a desired gap condition.

As shown in FIG. 16, the servo gain is increased by a multiplication-type digital-to-analog converter 27 as the gap condition gets worse. An amplifier 401 composed of resistors 402, 403 and an operational amplifier 404 is connected to the output of the converter 27 and has an output coupled to the input of a motor driver amplifier 405 in the control unit 14. A speed command voltage Fx would otherwise be applied directly to the input of the motor driver amplifier 405. Therefore, the speed of operation of a table feed motor Mx can be varied.

The servo gain is increased substantially linearly in proportion to the bad gap condition. However, it is not necessary for the servo gain to vary linearly, but the servo gain may be varied as a quadratic function of the gap condition or along a curve of polygonal lines. Two-step control employing the detected signal from the counter 25 can easily be accomplished and is inexpensive to achieve.

According to an experiment, it was found that when the gap condition becomes poor, the wire electrode would be broken unless the gap varying speed were at least 20 mm/minute, and that when a large amount of sludge is deposited in the gap, the gap varying speed would be required to be 200 mm/minute or higher. It was also confirmed that for stable machining, the machining efficiency is high at a speed ranging from 5 to 10 mm/minute for a finishing process to achieve a surface roughness of 15 μRmax or below.

The wire electrode is employed in each of the first through eighth embodiments. However, the above embodiments are applicable to a discharge machining apparatus which uses a rod-shaped electrode.

Ninth and tenth embodiments are directed to control means in discharge machining apparatus employing wire electrodes.

Figure 17:
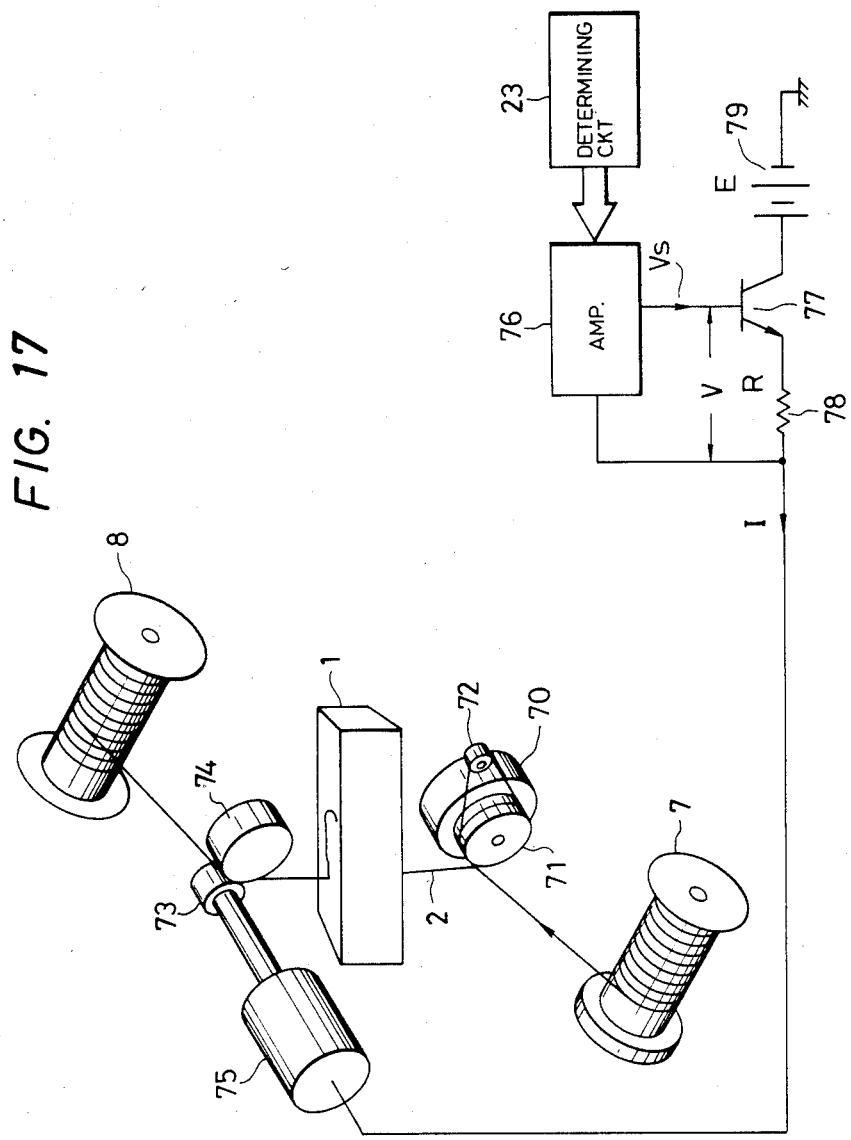

FIG. 17 shows a ninth embodiment in which the speed at which a wire electrode is fed on the basis of an output from a determining means. A wire unreeled from a supply reel 7 of a wire feeding mechanism is tensioned by a tension motor 70, a tension reel 71, and an auxiliary reel 72, pulled through a machining gap in a workpiece by a capstan 73, a capstan roller 74, and a capstan motor 75, and then wound on a take-up reel 8.

When discharge concentration or a condition immediately prior to a wire breakage is detected as a result of a bad gap condition, a voltage is issued from a determining circuit 23, amplified by an amplifier 76, and applied as a base voltage to a control transistor 77. A current I flowing through a motor is given by:

$$I = \frac{V}{R} = \frac{Vs - VBE}{R} \approx \frac{Vs}{R}$$

where R is the resistance of an emitter resistor 78, and Vs is a motor control voltage according to the circuit 25. The voltage VBE is of a small value which is about 0.6V, and is thus negligible. The motor current is controlled by the motor control voltage Vs. The motor control voltage Vs is increased to increase the motor current for thereby increasing the wire feeding speed. As the wire is fed at a high speed, the discharge point is forcibly moved and scattered to eliminate discharge concentration, and at the same time the amount of consumption of the wire per unit length is reduced, so that the wire is less liable to be broken.

The greater the wire feeding speed, the larger the rate becomes at which sludge is discharged, resulting in reduced short-circuiting and an increased machining speed. However, it is not economical as the amount of wire consumption is increased. Therefore, when the gap condition becomes dangerous, the wire is fed rapidly, and when the gap condition is good, the wire is fed slowly. While the workpiece is not being machined, the wire is fed in conventional discharge machining apparatus, but is fed slowly in the discharge machining apparatus of the present invention. Consequently, the discharge machining apparatus of the invention is economical.

The tenth embodiment will be described with reference to FIG. 18. Those parts which are identical to those shown in FIG. 17 are denoted by identical reference numerals. When discharge concentration or a condition immediately prior to a wire breakage is detected as a result of a bad gap condition, a voltage is issued from the determining circuit 23, amplified by an amplifier 76, and applied as a base voltage to a control transistor 77. A current I flowing through a motor is given by:

$$I = \frac{V}{R} = \frac{Vs - VBE}{R} \approx \frac{Vs}{R}$$

where R is the resistance of an emitter resistor 78, and Vs is a motor control voltage according to the circuit 25. The voltage VBE is of a small value which is about 0.6V, and is thus negligible. The motor current is controlled by the motor control voltage Vs. The motor control voltage Vs is reduced and so the motor current is also reduced, resulting in a reduction in the wire tension. Thus, the wire which has become less resistant to tension due to abnormal consumption or wear because of discharge concentration is protected against breakage. When the gap condition is improved, the tension applied to the wire is gradually increased.

The greater the wire tension, the larger the wire rigidity and the less the possibility of short-circuiting, resulting in a higher machining speed. According to the present embodiment, the wire tension is controlled at all times so that the wire is tensioned to its tension limit. Another advantage is that by reducing the wire tension, short-circuiting is brought about to prevent the wire from being broken while effecting backward movement upon short-circuiting, and other measures (to eliminate the load by reducing the current and moving the wire backward) for preventing discharge concentration are taken to make it possible to avoid abnormal machining more reliably.

Figure 19:
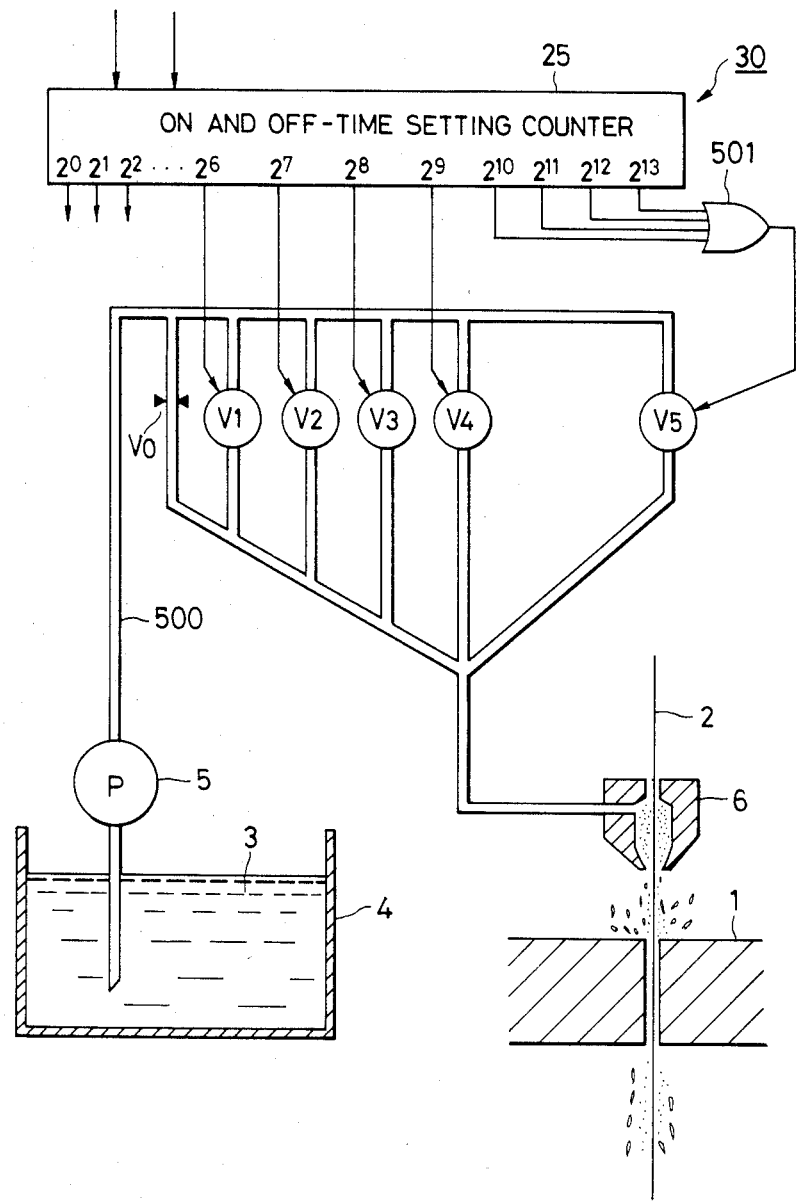

FIG. 19 shows an eleventh embodiment of the present invention. As shown, a machining liquid 3 drawn from a tank 4 by a machining liquid supply pump 5 flows through a pipe 500 and is supplied through flow control valves V1, V2, V3, V4 to a nozzle 6. The rate of flow of the machining Liquid to the nozzle 6 can be varied by opening and closing the valves V1, V2, V3, V4 which are controlled by outputs $2^6$ through $2^9$ of the counter 25. According to the illustrated embodiment, the flow control valves V1, V2, V3, V4 are capable of allowing the liquid to flow at respective rates of 100 cc/min., 200 cc/min., 400 cc/min., and 800 cc/min. Therefore, the machining liquid can be ejected into the gap at a rate dependent on the gap condition. For example, when the count of the counter 25 is $2^6$ or 64, the output from the terminal $2^6$ is "1", and hence the valve V1 is opened to permit the machining liquid to flow at the rate of 100 cc/min. to the nozzle 6. When the count of the counter 25 is 192, the outputs from the terminals $2^6$, $2^7$ are "1", thus opening the valves V1, V2 to allow the liquid to flow at 300 cc/min. to the nozzle 6.

When the count of the counter 25 is of a very high value, e.g., or $2^{10}$ or 1024 or higher, a forced-ejection valve V5 is opened by an OR gate 501 to supply the liquid at a rate of few thousand cc/min. When the count is very small, the liquid is supplied at a small rate used for normal machining to the gap through a manually operated valve V0.

The embodiment of FIG. 19 may be incorporated in a discharge machining apparatus employing a rod-shaped electrode, as with the first through eighth embodiments.

Figure 20:
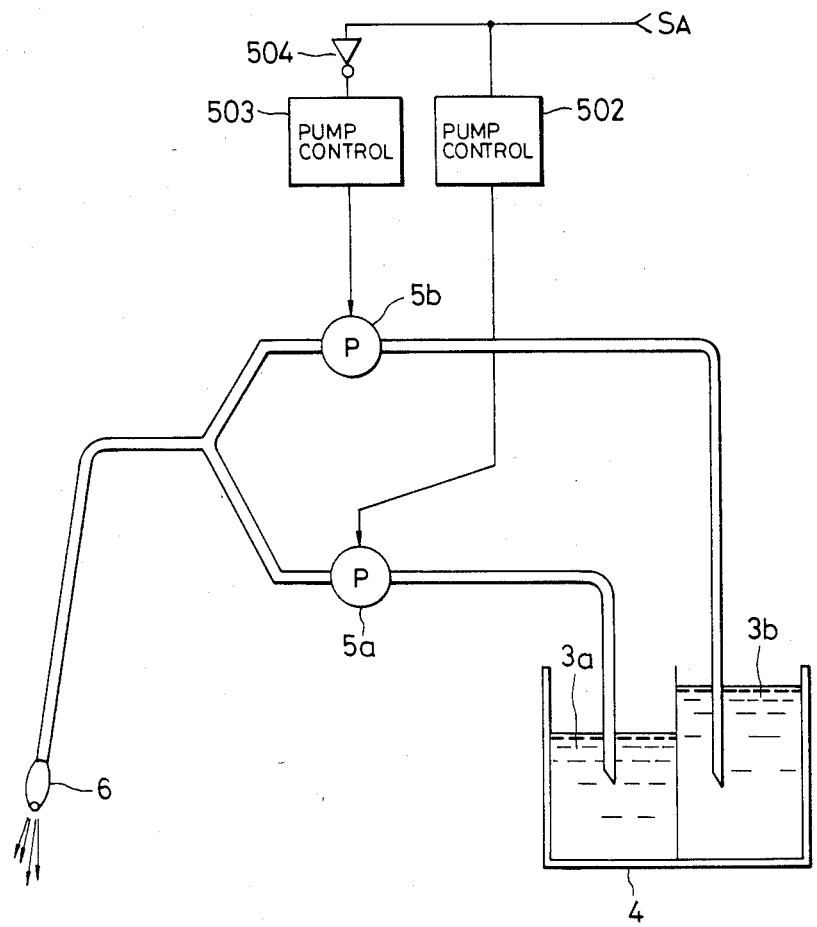

In a twelfth embodiment shown in FIG. 20, the rate of flow of the machining liquid is controlled according to the output from the counter 25. As illustrated, a machining liquid ejecting nozzle 6 is supplied with a machining liquid from machining liquid supply pumps 5a, 5b. The pump 5a is coupled to a tank compartment of a tank 4 containing a liquid 3a having a low resistivity, whereas the pump 5b is coupled to a different tank compartment containing a liquid 3b having a high resistivity. The pumps 5a, 5b are selectively turned on and off by respective pump control circuits 502, 503 which are supplied with the detected signal SA. When SA=0, i.e., when discharges are normal, the pump control circuit 503 is operated by an input from an inverter 504 to actuate the pump 5b for thereby supplying the machining liquid of high resistivity to the gap. When the machining condition becomes abnormal and a condition immediately prior to wire breakage is reached, the signal SA becomes "1" and the pump control circuit 502 is operated to actuate the pump 5a which supplies the machining liquid of low resistivity, making it easier for discharges to take place even across a wide discharge gap. Previously, the resistivity in the gap is lowered by a local sludge deposit in the gap, causing a local discharge concentration. With the present embodiment, the resistivity is uniformly lowered in all discharge ranges to scatter discharges for thereby preventing the wire from being broken. The ease with which discharges take place is entirely increased to allow discharges across a wide gap, and hence short-circuiting is reduced (contact which has been made at the vibration width of the wire can be increased to 20 to 50 m) for stable machining condition. Where the workpiece is continuously machined with the liquid of low resistivity, the machining gap is too widened and highly accurate wire cutting cannot be carried out. Thus, when the gap condition is stable again, it is necessary to gain the high resistivity once more in the gap. Therefore, when SA becomes "0" again, the machining liquid of high resistivity is employed to effect highly accurate machining in a small machining gap.

While two resistivities are employed in the above embodiment, a greater number of resistivities can be employed for continuous selection responsive to the output from the counter 25.

Figure 21:
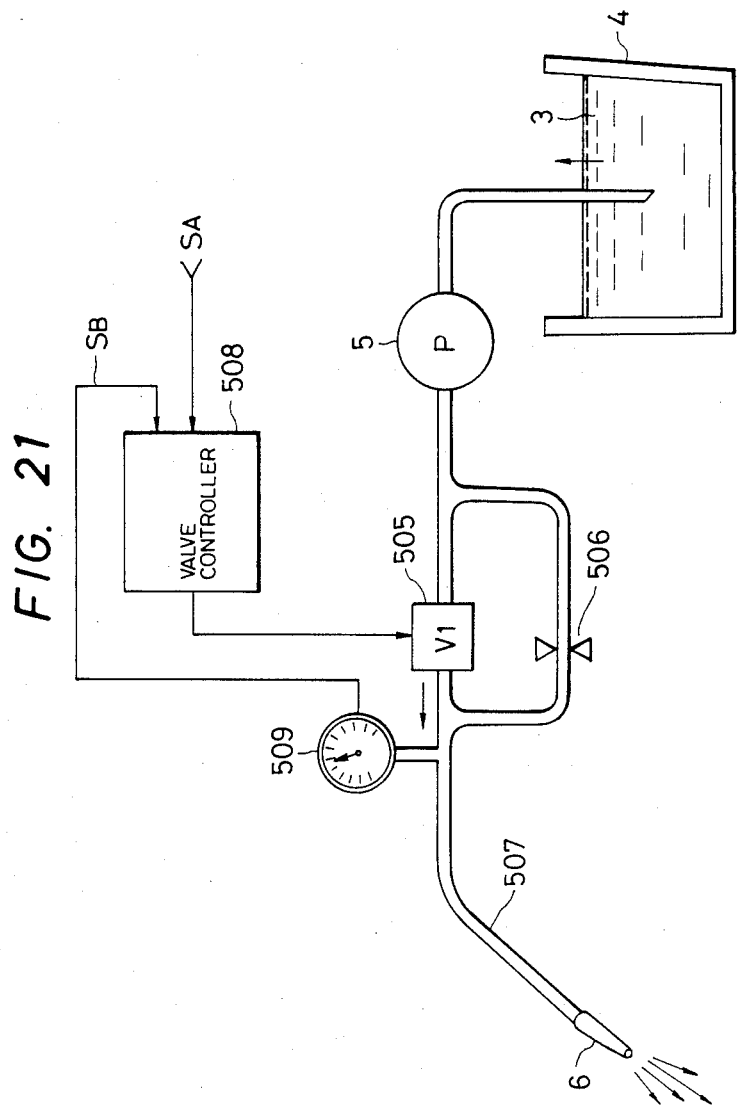

The gap condition can be restored by varying the pressure at which the machining liquid is ejected into the gap dependent on whether there is a detected signal SA from the counter or not. FIG. 21 shows a thirteenth embodiment directed to such a control mode. As shown, a machining liquid drawn from a machining liquid tank 4 by a machining liquid supply pump 5 flows through a solenoid-operated valve 505 and a manually operated valve 506 and is delivered through a pipe 507 coupled to a nozzle 6. The pressure at which the machining liquid flows through the pipe 507 is measured by a liquid pressure meter relay 509. When the liquid pressure is in excess of a prescribed pressure level, the liquid pressure meter relay 509 applies a feedback signal SB to a valve controller 508 which controls the solenoid-operated valve 505 to keep a suitable pressure in the pipe 507. The manually operated valve 506 serves to keep a minimum pressure when the solenoid operated valve 505 fails to operate. When the machining condition becomes poor and a sludge deposit is collected in the gap, the signal SA is produced and applied to the valve controller 508. The solenoid-operated valve 505 is then opened and is kept open until a signal SB is fed from the liquid pressure meter relay 509 back to the valve controller 508. The sludge deposit is now removed out of the gap by the strong pressure at which the liquid is ejected from the nozzle 6, for restoring the gap. As the gap is recovered, the signal SA is no longer generated, and the solenoid-operated valve 505 is closed and the liquid is delivered under a weak pressure which is established by the manually operated valve 506 only. The two different liquid pressures are necessary for the following reasons: Generally, the gap impedance is optimum when the pressure is about 0.05 kg/cm$^2$ (discharges can easily be brought about and machining stability is good when the gap is appropriately dirty). At or higher than 0.5 kg/cm$^2$, the impedance of the gap would be too high and the gap length would be too small for discharges to occur, resulting in a greater tendency of short-circuiting and more unstable machining. It is desirable to machine the workpiece normally under 0.05 kg/cm$^2$ or less. The higher-pressure liquid flow is required only when the gap is too dirty or a sludge deposit is locally present.

With the above embodiment, the pressure at which the machining liquid is ejected is controlled in response to whether the gap condition is good or not, for efficiently discharging sludge out of the gap, with the consequence that the machining efficiency is highly increased. More specifically, if there is a sludge deposit in the gap, discharge sparks are produced in a path from the electrode to the sludge deposit to the workpiece. Therefore, a considerable proportion of the discharge energy would be consumed to thermally decompose the sludge and the machining liquid, reducing the machining speed. Such a phenomenon is prevented by this embodiment. Further, the wire is prevented from being locally consumed or worn, and from being broken due to discharge concentration. Thus, an abnormal discharge condition is detected by the conventional circuit and the gap condition is restored as a result of such detection by varying the pressure of the machining liquid to discharge the sludge out of the gap and restore the desired gap condition.

Figure 22:
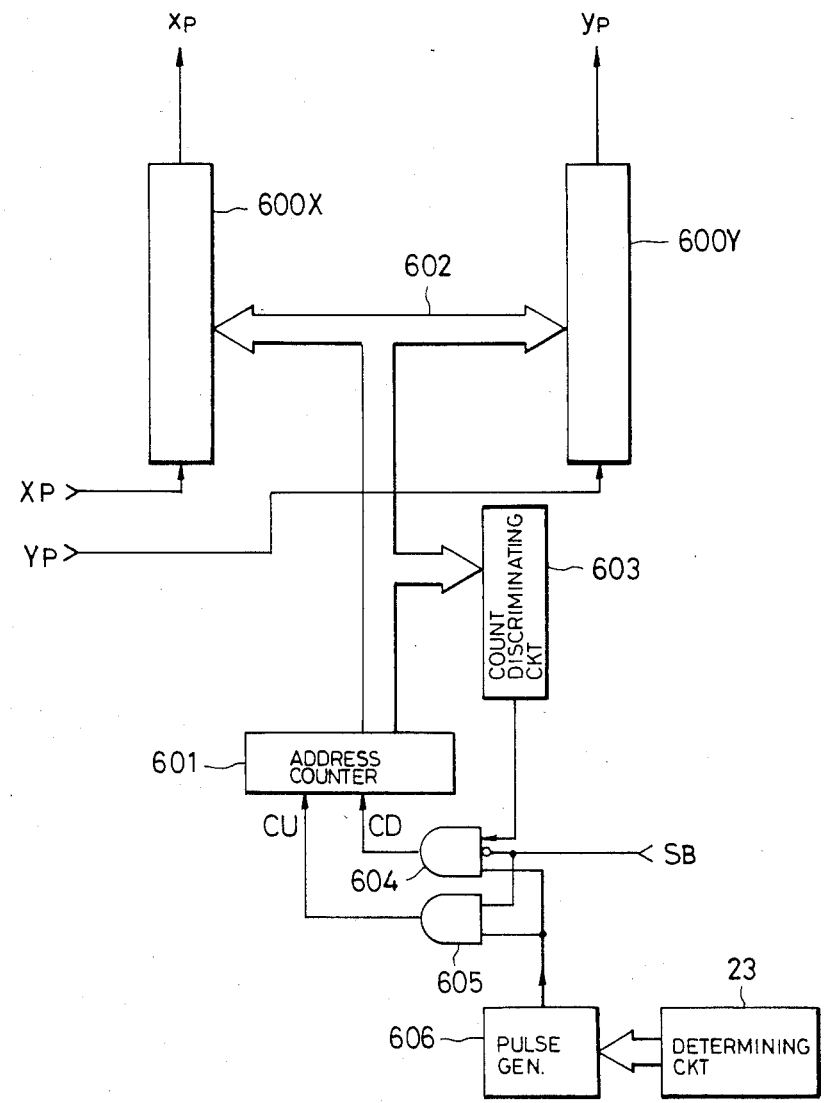

FIG. 22 shows a fourthteenth embodiment in which a means for restoring the gap condition is operated on the basis of the count of the counter 25 to eliminate a difficulty which would lead to a wire breakage.

In the arrangement of FIG. 22, when a short circuit occurs between the wire electrode and the workpiece, the wire electrode is moved back along its path in which the workpiece has been cut, and the speed at which the wire electrode is moved back along the path is varied.

The principles of such backward movement of the wire electrode will be described below. The X- and Y-positions of the wire electrode path are stored respectively in memories 600X, 600Y which store pulse trains as they are generated when the wire electrode is fed along the X- and Y-axes. Each of the memories 600X, 600Y usually has a storage capacity for a distance ranging from 1 to 5 mm. The memories 600X, 600Y are connected to an address counter 601. When the address counter 601 adds addresses, the X and Y path positions are produced from memory outputs xp, yp for a backward path. When the address counter 601 subtracts addresses, memory outputs Xp, Yp are generated to move the wire electrode in a forward direction again along the backward path. The frequencies of addition and subtraction by the address counter 601 therefore determine the speeds of backward and forward movements. An address bus 602 is coupled to the memories 600X, 600Y. If each of the memories has a capacity of 2045μm (1 μm is a storage unit), then the address bus is of a 12-bit configuration. A count discriminating circuit 603 serves to determine whether the count of the address counter 601 is "0" as a result of subtraction, indicating a backward movement initiating position. The circuit 603 may be a digital comparator. In operation, until a short circuit occurs, path pulses Xp, Yp for X and Y path positions are generated and successively stored in the memories 600X, 600Y. Once a short circuit takes place, a short-circuit signal, SB becomes "1", and an addition signal of a frequency dependent on how stable the gap is, is applied from a pulse generator 606 which is frequency-controlled by the gap condition signal (from the circuit 23) to the address counter 601 via AND gates 604, 605. The frequency of the addition signal is high when the gap condition is unstable, and is low when the gap condition is stable. When the short circuit is eliminated and SB becomes "0", the count of the counter 601 is subtracted until it reaches "0" or the original position in the backward path is reached.

Therefore, as the machining condition becomes unstable and the gap condition gets worse, the speed at which the wire electrode is to move along the backward path in case of short-circuiting is varied from time to time. When a short circuit is brought about, the wire electrode is moved back at the speed dependent on the machining condition immediately prior to the short circuit. More specifically, when the machining condition is quite bad, the wire electrode is moved back at a high speed, i.e., for a large distance per unit time, and when the machining condition is not so bad, the wire electrode is moved back for a reduced distance.

A short circuit happens also when sludge is collected in the gap and the gap impedance is lowered, as well as when the wire electrode contacts the workpiece. Short-circuiting occurs also when a discharge takes place while there is almost no non-load time due to discharge concentration. Thus, short-circuit detection and a condition immediately prior to a wire breakage are very closely related to each other. When this happens, the wire electrode should be moved back as rapidly as possible to avoid the danger of wire breakage. The present invention can effectively prevent wire breakage.

While the circuit arrangement of FIG. 22 is implemented by hardware, the speed of backward movement dependent on the machining condition may be computed and given as an F value (speed command) of an NC command since present NC (numerical control) is usually CNC (computerized NC) almost exclusively.

Figure 18:
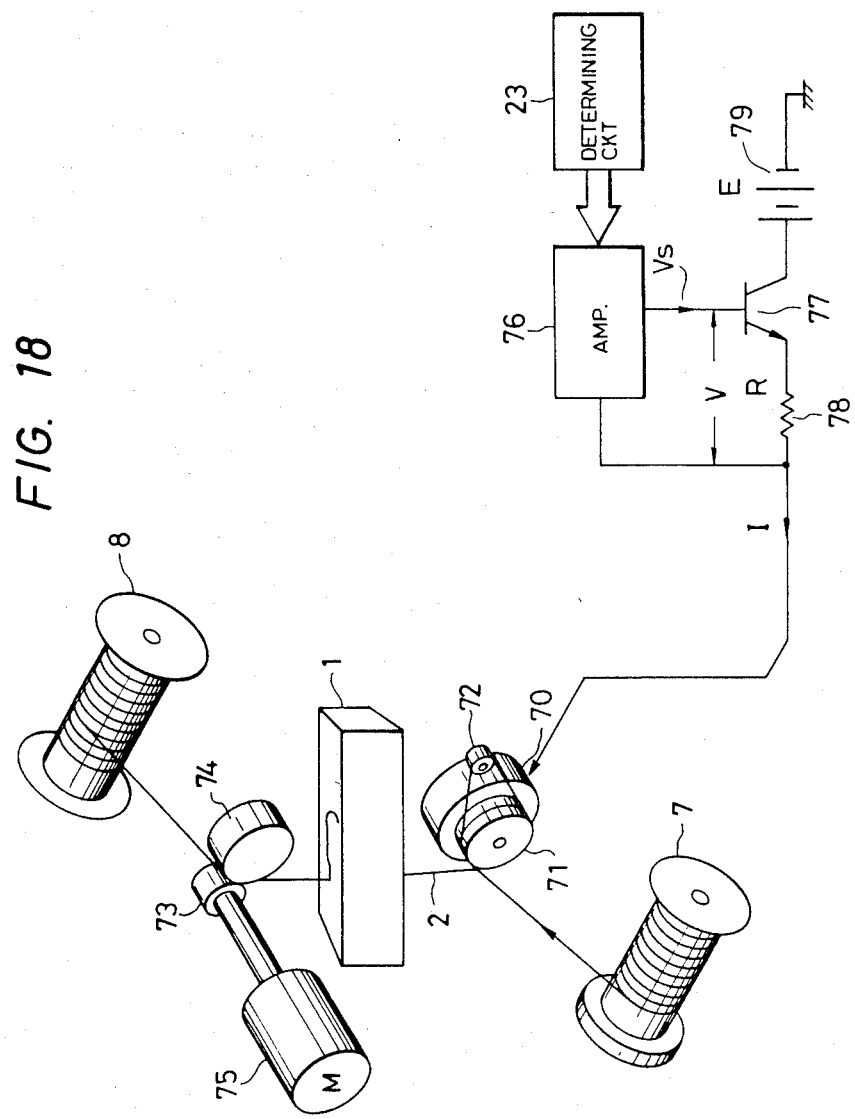

As described above, the embodiments of the present invention, except those of FIGS. 17 and 18, are equally applicable to other discharge machining apparatus employing rod-shaped electrodes rather than wire electrodes.

Although certain preferred embodiments have been shown and described, it should be understood that many changes and modifications may be made therein without departing from the scope of the appended claims.

What is claimed is:

1. An electric discharge machining apparatus comprising:

a wire-shaped electrode disposed in confronting relation to a workpiece with an insulative machining liquid provided therebetween;

means for applying a DC pulse voltage between said electrode and said workpiece to produce an electric discharge therebetween;

means for superposing a high-frequency AC voltage, different from said DC pulse voltage, in a quiescent time of the DC pulse voltage applied between said electrode and said workpiece;

detecting means for detecting the degree of insulation of said insulative machining liquid which is present between said electrode and said workpiece in accordance with said high-frequency AC voltage;

comparing means for comparing the degree of insulation as detected by said detecting means in a gap between said electrode and said workpiece with a predetermined reference value and providing an output signal accordingly;

gap condition determining means for determining the condition of the gap and issuing at least one output signal indicative of the gap condition based on the output signal form said comparing means; and control means for modifying the gap condition between said electrode and said workpiece based on said at least one output signal from said gap condition determining means.

2. An electric discharge machining apparatus according to claim 1, wherein said control means includes means responsive to said at least are output signal from said gap condition determining means for controlling a quiescent time of said pulse voltage applied across said gap.

3. An electric discharge machining apparatus according to claim 1, wherein said control means includes means responsive to said at least one output signal from said gap condition determining means for controlling a voltage value of said pulse voltage applied across said gap.

4. An electric discharge machining apparatus according to claim 1, wherein said control means includes means responsive to said at least one output signal from said gap condition determining means for controlling a positive-going condition of said pulse voltage applied across said gap.

5. An electric discharge machining apparatus according to claim 1, wherein said control means includes means responsive to said at least one output signal from said gap condition determining means for controlling a pulse duration of said pulse voltage applied across said gap.

6. An electric discharge machining apparatus according to claim 1, wherein said control means includes means responsive to said at least one output signal from said gap condition determining means for controlling a current peak value of a pulse current flowing through said gap.

7. An electric discharge machining apparatus according to claim 1, wherein said control means includes means responsive to said at least one output signal from said gap condition determining means for ascertaining whether the pulse voltage is continuously or intermittently applied across said gap until an electric discharge occurs there across.

8. An electric discharge machining apparatus according to claim 1, wherein said control means includes means responsive to said at least one output signal from said gap condition determining means for controlling a servo reference voltage for servo control of the length of the gap between said electrode and said workpiece.

9. An electric discharge machining apparatus according to claim 1, wherein said control means includes means responsive to said at least one output signal from said gap condition determining means for controlling a servo gain for servo control of the length of the gap between said electrode and said workpiece.

10. An electric discharge machining apparatus according to claim 1, wherein said electrode comprises a wire electrode, said control means includes means responsive to said a least one output signal from said gap condition determining means for controlling a speed at which said wire electrode is to be fed.

11. An electric discharge machining apparatus according to claim 1, wherein said electrode comprises a wire electrode, said control means includes means responsive to said at least one output signal from said gap condition determining means for controlling a tension to which said wire electrode is subjected.

12. An electric discharge machining apparatus according to claim 1, wherein said control means includes means responsive to said a least one output signal from said gap condition determining means for controlling a rate at which said insulative machining liquid is ejected.

13. An electric discharge machining apparatus according to claim 1, wherein said control means includes means responsive to said at least one output signal from said gap condition determining means for controlling a resistivity of said insulative machining liquid.

14. An electric discharge machining apparatus according to claim 1, wherein said control means includes means responsive to said at least one output signal from said gap condition determining means for controlling a pressure under which said insulative machining liquid is ejected.

15. An electric discharge machining apparatus according to claim 1, wherein said control means includes means responsive to said at least one output signal from said gap condition determining means for controlling a speed of backward movement of said electrode and a speed of returning movement thereof in case of short circuiting between said electrode and said workpiece.

16. An electric discharge machining apparatus according to claim 1, wherein said high-frequency AC voltage has a frequency form 100 kHz to 2 MHz.

17. An electric discharge machining apparatus according to claim 1, wherein said at least one output signal from said gap condition determining means comprises a danger signal indicative of insulative deterioration in said gap.

18. an electric discharge machining apparatus according to claim 1, wherein said at least one output signal form said gap condition determining means comprises a signal corresponding to an analog voltage and indicative of condition of insulation in said gap.

19. An electric discharge machining apparatus according to claim 17, wherein said at least one signal from said gap condition determining means further comprises an output signal corresponding to an analog voltage and indicative of insulation condition in said gap.

20. An electric discharge machining apparatus according to claim 18, wherein said at least one output signal from said gap condition determining means further comprises an output signal which is a danger signal indicative of insulation deterioration in said gap.

* * * * *

UNITED STATES PATENT AND TRADEMARK OFFICE
CERTIFICATE OF CORRECTION

PATENT NO. : 4,798,929

DATED : January 17, 1989

INVENTOR(S) : Tetsuroh Itoh

It is certified that error appears in the above-identified patent and that said Letters Patent is hereby corrected as shown below:

COLUMN 18, line 30;

Claim 2, line 3, delete "are" and insert --one--.

Signed and Sealed this

Tenth Day of March, 1992

Attest:

HARRY F. MANBECK, JR.

*Attesting Officer*     *Commissioner of Patents and Trademarks*